(12) United States Patent
Ichiryu et al.

(10) Patent No.: US 8,263,725 B2
(45) Date of Patent: Sep. 11, 2012

(54) CURABLE COMPOSITION

(75) Inventors: Yoshikatsu Ichiryu, Settsu (JP); Katsuya Ouchi, Settsu (JP)

(73) Assignee: Kaneka Corporation, Osaka (JP)

( * ) Notice: Subject to any disclaimer, the term of this patent is extended or adjusted under 35 U.S.C. 154(b) by 322 days.

(21) Appl. No.: 12/159,137

(22) PCT Filed: Dec. 26, 2006

(86) PCT No.: PCT/JP2006/325890
§ 371 (c)(1),
(2), (4) Date: Nov. 5, 2008

(87) PCT Pub. No.: WO2007/074813
PCT Pub. Date: Jul. 5, 2007

(65) Prior Publication Data
US 2010/0222525 A1  Sep. 2, 2010

(30) Foreign Application Priority Data

Dec. 26, 2005  (JP) ................. 2005-373458
Nov. 20, 2006  (JP) ................. 2006-313190

(51) Int. Cl.
C08G 77/04 (2006.01)
C08G 77/42 (2006.01)
C08G 65/22 (2006.01)
C08F 283/12 (2006.01)

(52) U.S. Cl. .............. 528/27; 528/31; 528/37; 528/393; 525/479

(58) Field of Classification Search ............ 525/479
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,379,653 A | 4/1968 | Ernst et al. | |
| 3,516,946 A | 6/1970 | Modic | |
| 3,517,001 A * | 6/1970 | Berger | 544/221 |
| 3,586,616 A | 6/1971 | Kropp | |
| 3,708,296 A | 1/1973 | Schlesinger | |
| 3,821,218 A * | 6/1974 | Berger | 544/221 |
| 3,892,643 A * | 7/1975 | Tanaka et al. | 522/167 |
| 3,896,123 A * | 7/1975 | DeZuba et al. | 544/219 |
| 4,058,400 A | 11/1977 | Crivello | |
| 4,069,055 A | 1/1978 | Crivello | |
| 4,086,091 A | 4/1978 | Cella | |
| 4,139,655 A | 2/1979 | Tsao | |
| 4,161,478 A | 7/1979 | Crivello | |
| 4,231,951 A | 11/1980 | Smith et al. | |
| 4,256,828 A | 3/1981 | Smith | |
| 4,406,807 A * | 9/1983 | Renner et al. | 252/78.3 |
| 5,101,029 A | 3/1992 | Stapp et al. | |
| 5,652,276 A | 7/1997 | Ando et al. | |
| 6,037,043 A * | 3/2000 | Lehner et al. | 428/209 |
| 6,194,482 B1 * | 2/2001 | Lehner et al. | 522/111 |

FOREIGN PATENT DOCUMENTS

| | | | |
|---|---|---|---|
| EP | 399199 A | * | 11/1990 |
| JP | 03-002189 A | | 1/1991 |
| JP | 2001-019742 A | | 1/2001 |
| JP | 2003-292568 A | | 10/2003 |
| JP | 2004-002783 A | | 1/2004 |
| JP | 2004-099751 A | | 4/2004 |
| JP | 2004-238589 A | | 8/2004 |

OTHER PUBLICATIONS

Watt, W.R., et al., "A Novel Photoinitiator of Cationic Polymerization: Preparation and Characterization of Bis [4-(diphenylsulfonio) phenyl]sulfide—Bis-Hexafluorophosphate," Journal of Polymer Science, 1984, pp. 1789-1796, vol. 22, Polymer Chemistry Ed.

* cited by examiner

Primary Examiner — Randy Gulakowski
Assistant Examiner — Mike M Dollinger
(74) Attorney, Agent, or Firm — Sughrue Mion, PLLC

(57) ABSTRACT

Cured products constituted with conventional epoxy compounds have been disadvantageous in heat-resistant and light-resistant transparency, and crack resistance. An object of the present invention is to provide: a modified polyorganosiloxane compound having an epoxy group and/or an oxetanyl group which provides a cured product that is excellent in heat-resistant and light-resistant transparency, and crack resistance; a curable composition thereof; and a cured product obtained by curing the same. Disclosed is a modified polyorganosiloxane compound having two or more epoxy group and/or oxetanyl group in a molecule, the compound being a hydrosilylation reaction product of the following compounds:

(α1) an organic compound having 2 to 6 carbon-carbon double bonds reactive with a SiH group in a molecule;

(β1) a linear and/or cyclic polyorganosiloxane compound having at least two SiH groups in a molecule; and (γ1) an organic compound having at least one epoxy group or oxetanyl group and one carbon-carbon double bond reactive with a SiH group in a molecule.

11 Claims, No Drawings

CURABLE COMPOSITION

CROSS REFERENCE TO RELATED APPLICATIONS

This application is a National Stage of International Application No. PCT/JP2006/325890 filed on Dec. 26, 2006, claiming priority based on Japanese Patent Application Nos. 2005-373458 filed on Dec. 26, 2005 and 2006-313190 filed on Nov. 20, 2006, the contents of all of which are incorporated herein by reference in their entirety.

TECHNICAL FIELD

The present invention relates to a curable composition, and more particularly, relates to a modified polyorganosiloxane compound having an epoxy group and/or an oxetanyl group which provides a cured product that is excellent in optical transparency, heat resistance and light resistance, and a curable composition and a cured product obtained by curing the same.

BACKGROUND ART

In general, optical semiconductor devices are constructed by resin sealing of an optical semiconductor element such as a light emitting diode or photodiode with an epoxy resin composition. In the case of blue LED and white LED which have attracted the attention in recent years, the sealing resin greatly requires heat resistance during electrification which can endure even under heat generation, in addition to optical transparency and light resistance.

When a conventional epoxy resin composition is used as the sealing resin, heat and light resistance becomes insufficient, and deterioration of the luminance is caused in a short period of time. Thus, in Patent Document 1 and Patent Document 2, for example, a study on use of the following alicyclic epoxy resin is disclosed as means for improving the light resistance.

[chemical formula 3]

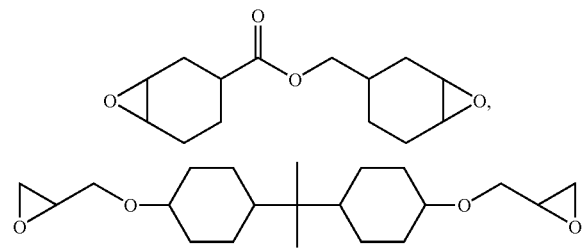

However, according to the techniques in which such an alicyclic epoxy resin is used, heat resistant transparency is still insufficient, and further improvement of the heat resistant transparency is strongly desired.

In addition, in Patent Document 3, for example, a study on use of an epoxy resin composition containing the following silicone resin having epoxy groups is disclosed as a sealing resin for optical semiconductors.

[chemical formula 4]

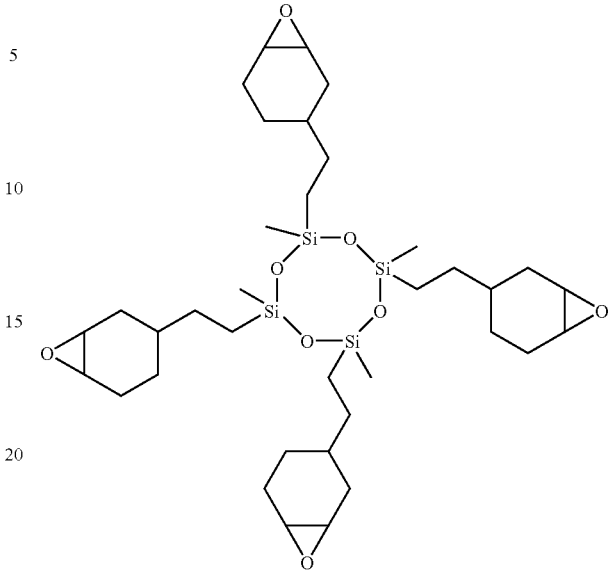

However, the polyether structure produced by cation polymerization of the epoxy group is generally inferior in the heat resistance, therefore, cured products of the curable composition having many epoxy groups are accompanied problems of heat and light resistance. Accordingly, there still exists a great need for development of a heat and light resistant resin having optical transparency.

[Patent Document 1] Japanese Unexamined Patent Application No. 2003-292568
[Patent Document 2] Japanese Unexamined Patent Application No. 2001-19742
[Patent Document 3] Japanese Unexamined Patent Application No. 2004-238589

DISCLOSURE OF THE INVENTION

Problems to be Solved by the Invention

An object of the present invention is to provide: a modified polyorganosiloxane compound having an epoxy group and/or an oxetanyl group which provides a cured product that is excellent in heat-resistant and light-resistant transparency, and crack resistance; a curable composition thereof; and a cured product obtained by curing the same.

Means for Solving the Problems

As a result of elaborate investigation by the present inventors, it was found that the foregoing problems can be solved by using a hydrosilylation reaction product of an organic compound having a carbon-carbon double bond, a SiH group-containing polyorganosiloxane compound, and an organic compound having an epoxy group or an oxetanyl group and a carbon-carbon double bond. Thus, the present invention was accomplished.

Accordingly, a first aspect of the present invention relates to a modified polyorganosiloxane compound having two or more epoxy group and/or oxetanyl group in a molecule, the compound being a hydrosilylation reaction product of the following compounds:

(α1) an organic compound having 2 to 6 carbon-carbon double bonds reactive with a SiH group in a molecule (hereinafter, may be merely referred to as "compound (α1)");

(β1) a linear and/or cyclic polyorganosiloxane compound having at least two SiH groups in a molecule (hereinafter, may be merely referred to as "compound (β1)"); and (γ1) an organic compound having at least one epoxy group or oxetanyl group and one carbon-carbon double bond reactive with a SiH group in a molecule (hereinafter, may be merely referred to as "compound (γ1)").

A second aspect of the present invention relates to the modified polyorganosiloxane compound according to the first aspect in which the compound (α1) is represented by the following general formula (I):

[chemical formula 5]

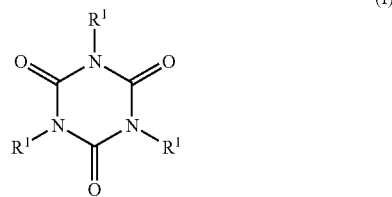

(I)

wherein, $R^1$ represents a monovalent organic group having 1 to 50 carbon atoms; each $R^1$ may be the same or different; and at least two $R^1$ include a carbon-carbon double bond reactive with a SiH group.

A third aspect of the present invention relates to the modified polyorganosiloxane compound according to the first aspect in which the compound (α1) is at least one selected from the group consisting of diallyl monoglycidyl isocyanurate, diallylmonobenzyl isocyanurate, 1,3-bis(allyloxy)adamantane, 1,3-bis(vinyloxy)adamantane, 1,4-cyclohexanedimethanol divinyl ether, dicyclopentadiene, divinylbenzene, vinylcyclohexene, 1,5-hexadiene, 1,9-decadiene, diallyl ether, triallyl isocyanurate, triallyl cyanurate, 1,2,4-trivinylcyclohexane, trimethylolpropane triallyl ether, 1,3,5-tris(allyloxy)adamantane, 1,3,5-tris(vinyloxy)adamantane, and pentaerythritol tetraallyl ether.

A fourth aspect of the present invention relates to the modified polyorganosiloxane compound according to any one of the first to third aspects in which the compound (β1) is a cyclic polyorganosiloxane compound having a SiH group represented by the following general formula (II):

[chemical formula 6]

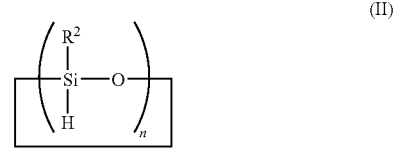

(II)

wherein, $R^2$ represents an organic group having 1 to 6 carbon atoms; and n represents an integer of 3 to 10.

A fifth aspect of the present invention relates to the modified polyorganosiloxane compound according to any one of the first to fourth aspects in which the compound (γ1) is at least one selected from the group consisting of 1,2-epoxy-4-vinylcyclohexene, 3-ethyl-3-allyloxymethyloxetane, and 1-allyloxy-2,3-epoxypropane.

A sixth aspect of the present invention relates to a curable composition including the modified polyorganosiloxane compound according to any one of the first to fifth aspects, and a cation polymerization initiator.

A seventh aspect of the present invention relates to the curable composition according to the sixth aspect in which the cation polymerization initiator is at least one selected from the group consisting of a boron based aromatic iodonium salt, an antimony based aromatic iodonium salt, and a phosphorus based aromatic iodonium salt.

An eighth aspect of the present invention relates to the curable composition according to the sixth or seventh aspect in which the content of the cation polymerization initiator is 0.01 to 1.0 parts by weight per 100 parts by weight of the modified polyorganosiloxane compound.

A ninth aspect of the present invention relates to the curable composition according to any one of the sixth to eighth aspects further including an organic compound having at least one cation polymerizable functional group.

A tenth aspect of the present invention relates to the curable composition according to the ninth aspect in which the cation polymerizable functional group of the organic compound having at least one cation polymerizable functional group is at least one selected from the group consisting of an alicyclic epoxy group, a glycidyl group, an oxetanyl group, and a vinyl ether group.

An eleventh aspect of the present invention relates to the curable composition according to the ninth or tenth aspect in which the organic compound having at least one cation polymerizable functional group is at least one selected from the group consisting of 1,4-bis{[(3-ethyl-3-oxetanyl)methoxy]methyl}benzene, bis[1-ethyl(3-oxetanyl)]methyl ether, and 3,4-epoxycyclohexenylmethyl-3,4'-epoxycyclohexenecarboxylate.

A twelfth aspect of the present invention relates to the curable composition according to any one of the ninth to eleventh aspects in which the content of the organic compound having at least one cation polymerizable functional group is 1 to 100 parts by weight per 100 parts by weight of the modified polyorganosiloxane compound.

A thirteenth aspect of the present invention relates to a cured product produced by curing the curable composition according to any one of the sixth to twelfth aspects.

Effects of the Invention

According to the present invention, a photocurable and/or thermocurable novel modified polyorganosiloxane compound having an epoxy group and/or an oxetanyl group can be provided which is excellent in optical transparency, heat resistance and light resistance, and which can be obtained by introducing an epoxy group and/or an oxetanyl group into a polyorganosiloxane skeleton, and a cured product that is excellent in optical transparency, heat resistance and light resistance can be provided.

BEST MODE FOR CARRYING OUT THE INVENTION (Compound (α1))

The compound (α1) of the present invention is first explained.

The compound (α1) is not particularly limited as long as it is an organic compound including 2 to 6 carbon-carbon double bonds reactive with a SiH group in a molecule. The organic compound does not include a siloxane unit (Si—O—Si) as in polysiloxane-organic block copolymers and polysiloxane-organic graft copolymers, but preferably includes only C, H, N, O, S and halogen as the constitutive element. Those including a siloxane unit may be problematic in gas transmittivity and repelling properties.

The binding site of the carbon-carbon double bond that is reactive with a SiH group is not particularly limited, and the double bond may be present anywhere in the molecule.

The organic compounds which may be the compound (α1) can be classified into organic polymer based compounds and organic monomer based compounds.

As the organic polymer based compound, for example, polyether based, polyester based, polyallylate based, polycarbonate based, saturated hydrocarbon based, unsaturated hydrocarbon based, polyacrylic acid ester based, polyamide based, phenol-formaldehyde based (phenol resin based), polyimide based compounds can be used.

Examples of the organic monomer based compound include e.g.: aromatic hydrocarbon based compounds such as phenol based and bisphenol based compounds, benzene, naphthalene and the like; aliphatic hydrocarbon based compounds such as linear and alicyclic compounds; heterocyclic compounds; and mixtures thereof, and the like.

The carbon-carbon double bond reactive with the SiH group in the compound (α1) is not particularly limited, but a group represented by the following general formula (III):

[chemical formula 7]

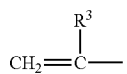

(III)

(wherein, R³ represents a hydrogen atom or a methyl group) is suitable in light of the reactivity. Also, a group represented by:

[chemical formula 8]

$CH_2=\overset{H}{\underset{|}{C}}-$ is particularly preferred in light of availability of the raw material.

The carbon-carbon double bond reactive with the SiH group in the compound (α1) is suitably an alicyclic group having a partial structure represented by the following general formula (IV):

[chemical formula 9]

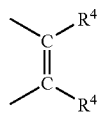

(IV)

(wherein, R⁴ represents a hydrogen atom or a methyl group) in the ring is suitable in light of high heat resistance of the cured product. Also, in light of availability of the raw material, an alicyclic group having a partial structure represented by the following formula:

[chemical formula 10]

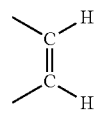

in the ring is suitable.

The carbon-carbon double bond reactive with the SiH group may be either directly bound to the skeletal part of the compound (α1), or covalently bound via a bivalent or more multivalent substituent. The bivalent or more multivalent substituent is not particularly limited as long as it is a substituent having 0 to 10 carbon atoms, but those including only C, H, N, O, S, and halogen as the constitutive element are preferred. Examples of these substituent include:

[chemical formula 11]

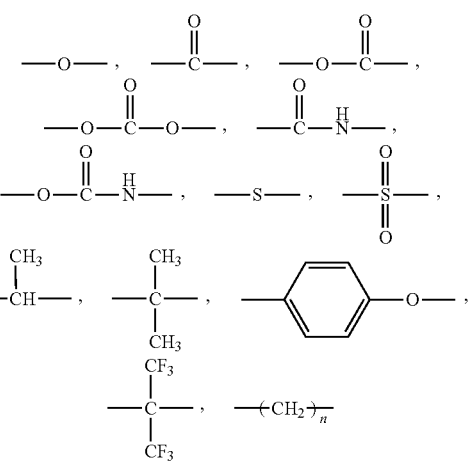

wherein n represents an integer of 1 to 10,

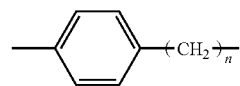

wherein n represents an integer of 0 to 4.

[chemical formula 12]

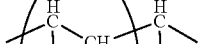

wherein n represents an integer of 0 to 4.

Alternatively, two or more of these bivalent or more multivalent substituents may be covalently bound to construct one bivalent or more multivalent substituent.

Examples of the group as described above that covalently binds to the skeletal part include a vinyl group, an allyl group, a methallyl group, an acryl group, a methacryl group, a 2-hydroxy-3-(allyloxy)propyl group, a 2-allylphenyl group, a 3-allylphenyl group, a 4-allylphenyl group, a 2-(allyloxy)phenyl group, a 3-(allyloxy)phenyl group, a 4-(allyloxy)phenyl group, a 2-(allyloxy)ethyl group, a 2,2-bis(allyloxymethyl)butyl group, a 3-allyloxy-2,2-bis(allyloxymethyl)propyl group, a vinyl ether group,

[chemical formula 13]

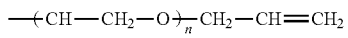

wherein n represents an integer of from 2 to 5,

wherein R represents a bivalent group selected from -O-, —CH$_2$—,

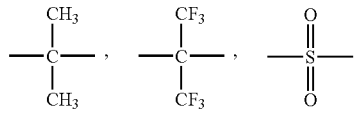

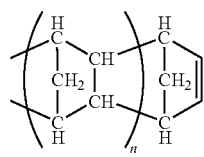

wherein n represents an integer of 0 to 4.

Specific examples of the compound (α1) include diallyl phthalate, triallyl trimellitate, diethylene glycol bisallyl carbonate, trimethylolpropane diallyl ether, trimethylolpropane triallyl ether, pentaerythritol triallyl ether, pentaerythritol tetraallyl ether, 1,1,2,2-tetraallyloxyethane, diallylidene pentaerythrite, triallyl cyanurate, triallyl isocyanurate, diallyl monoglycidyl isocyanurate, diallylmonobenzyl isocyanurate, 1,2,4-trivinylcyclohexane, 1,4-butanediol divinyl ether, nonanediol divinyl ether, 1,4-cyclohexanedimethanol divinyl ether, triethylene glycol divinyl ether, trimethylol propanetrivinyl ether, pentaerythritol tetravinyl ether, diallyl ether of bisphenol S, divinylbenzene, divinylbiphenyl, 1,3-diisopropenylbenzene, 1,4-diisopropenylbenzene, 1,3-bis(allyloxy)adamantane, 1,3-bis(vinyloxy)adamantane, 1,3,5-tris(allyloxy)adamantane, 1,3,5-tris(vinyloxy)adamantane, dicyclopentadiene, vinylcyclohexene, 1,5-hexadiene, 1,9-decadiene, diallyl ether, bisphenol A diallyl ether, tetraallyl bisphenol A, 2,5-diallylphenol allyl ether, and oligomers thereof, 1,2-polybutadiene (1,2 proportion: 10 to 100%, preferably 1,2 proportion: 50 to 100%), allyl ether of novolak phenol, allylated polyphenyleneoxide,

[chemical formula 14]

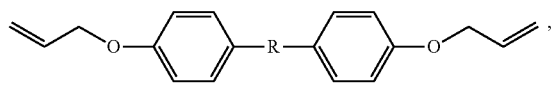

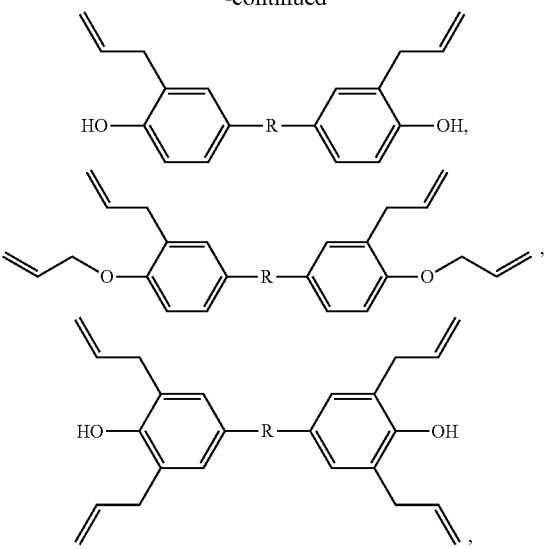

wherein R represents a bivalent group selected from —O—, —CH$_2$—,

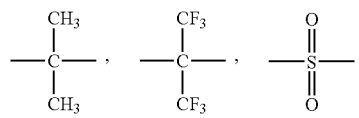

[chemical formula 15]

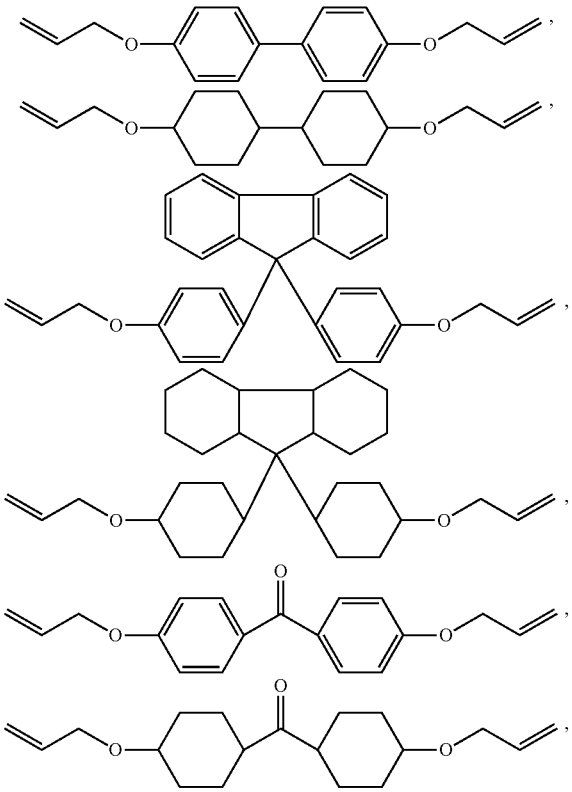

-continued

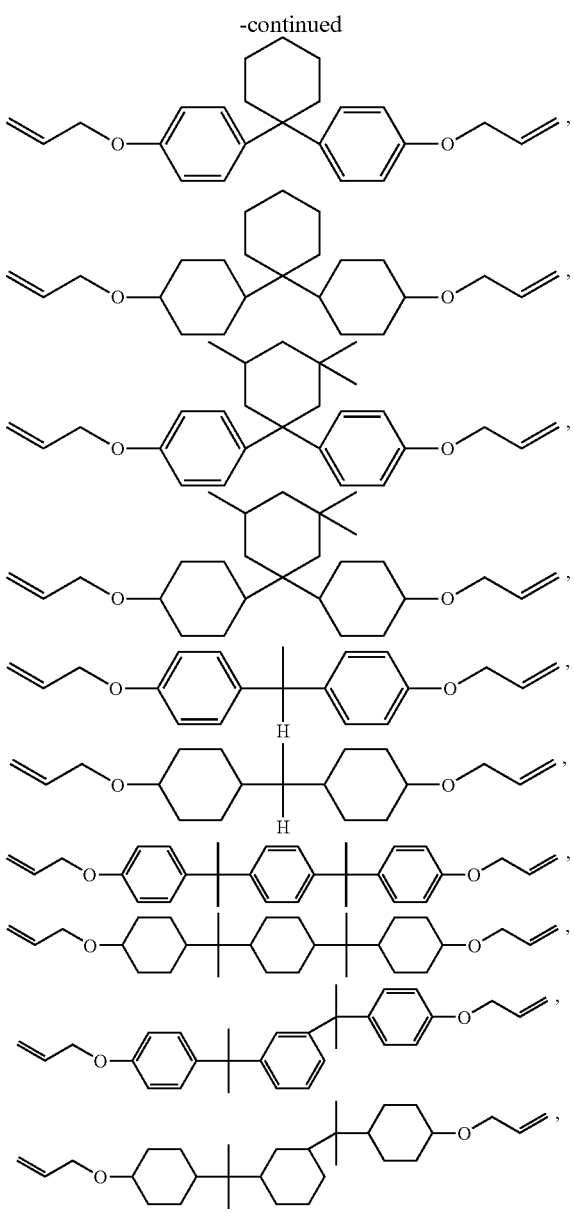

as well as conventionally known epoxy resins in which a part or all glycidyl group(s) is/are substituted with an allyl group, and the like.

As the compound (α1), a low molecular weight compound which can be hardly expressed in terms of the skeletal part and the alkenyl group (carbon-carbon double bond reactive with a SiH group) as described above can be also used. Specific examples of these low molecular weight compounds include aliphatic linear polyene based compounds such as butadiene, isoprene, octadiene and decadiene, aliphatic cyclic polyene based compounds such as cyclopentadiene, cyclohexadiene, cyclooctadiene, dicyclopentadiene, tricyclopentadiene and norbornadiene, substituted aliphatic cyclic olefin based compounds such as vinylcyclopentene and vinylcyclohexene, and the like.

Although the number of the carbon-carbon double bond reactive with the SiH group in the compound (α1) may be 2 to 6 per molecule on average, it is preferably greater than 2, and more preferably no less than 3 when improvement of the dynamic strength of the cured product is intended. When the number of the carbon-carbon double bond reactive with the SiH group in the compound (α1) is no more than 1 per molecule, a cross-linked structure is not formed but merely a graft structure is formed even after reaction with the compound (β1). To the contrary, when the number of the carbon-carbon double bond reactive with the SiH group in the compound (α1) per molecule is more than 6, gelation is likely to occur in synthesis of the modified polyorganosiloxane compound, and the storage stability of the curable composition may be inferior.

The compound (α1) preferably includes three or more carbon-carbon double bonds in a molecule, in light of favorable reactivity. Also, in light of likelihood of the storage stability to be more superior, it is more preferred that no more than 4 carbon-carbon double bonds are included in a molecule.

The compound (α1) has a molecular weight of less than 900, preferably less than 700, and more preferably less than 500, in light of high dynamic heat resistance, low stringiness of the raw material solution, and thus resulting favorable formability, handleability and coating properties.

The compound (α1) has a viscosity at 23° C. of preferably less than 100 Pa·s, more preferably less than 30 Pa·s, and still more preferably less than 3 Pa·s for achieving favorable workability. The viscosity can be measured with an E type viscometer.

The compound (α1) preferably has a low content of the compound having a phenolic hydroxyl group and/or a derivative of a phenolic hydroxyl group in light of suppression of coloring, particularly of yellowing, and one which does not contain the compound having a derivative of a phenolic hydroxyl group and/or a phenolic hydroxyl group is preferred. The phenolic hydroxyl group referred to herein means a hydroxyl group directly bound to the aromatic hydrocarbon ring typified by a benzene ring, a naphthalene ring, an anthracene ring or the like. The derivative of the phenolic hydroxyl group herein means a group yielded by substitution of the hydrogen atom of the aforementioned phenolic hydroxyl group with an alkyl group such as a methyl group or an ethyl group, an alkenyl group such as a vinyl group or an allyl group, an acyl group such as acetoxy group, or the like.

The compound (α1) is preferably vinylcyclohexene, dicyclopentadiene, triallyl isocyanurate, diallyl ether of 2,2-bis(4-hydroxycyclohexyl)propane, and 1,2,4-trivinylcyclohexane, in light of less coloring, and high light resistance of the resulting cured product, and particularly preferably, triallyl isocyanurate, diallyl monoglycidyl isocyanurate, diallyl ether of 2,2-bis(4-hydroxycyclohexyl)propane, and 1,2,4-trivinylcyclohexane.

The compound (α1) may also have other reactive group. Examples of the reactive group in this instance include an epoxy group, an oxetanyl group, an amino group, a radical polymerizable unsaturated group, a carboxyl group, an isocyanate group, a hydroxyl group, an alkoxysilyl group, and the like. When these functional groups are included, great adhesiveness of the resulting curable composition is likely to be attained, whereby the strength of the resulting cured product is likely to be increased. In light of capability of achieving a greater adhesiveness, an epoxy group is preferred among these functional groups. Also, in view of the likelihood of increase of the heat resistance of the resulting cured product, one or more reactive groups on average are preferably included in a molecule.

The compound (α1) is particularly preferably triallyl isocyanurate represented by the following general formula (I), and derivatives thereof, in light of high heat resistance and light resistance, in particular.

The compounds represented by the formula of:

[chemical formula 16]

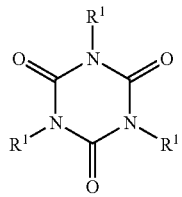 (I)

(wherein, $R^1$ represents a monovalent organic group having 1 to 50 carbon atoms; each $R^1$ may be the same or different; and at least two $R^1$ include the carbon-carbon double bond reactive with a SiH group) are preferred.

$R^1$ in the above general formula (I) is preferably a monovalent organic group having 1 to 20 carbon atoms, more preferably a monovalent organic group having 1 to 10 carbon atoms, and still more preferably a monovalent organic group having 1 to 4 carbon atoms, in light of possible increase of the heat resistance of the resulting cured product. Examples of the preferred $R^1$ include a methyl group, an ethyl group, a propyl group, a butyl group, a phenyl group, a benzyl group, a phenethyl group, a vinyl group, an allyl group, a glycidyl group,

[chemical formula 17]

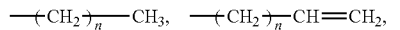

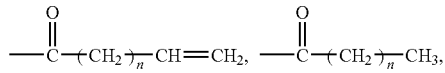

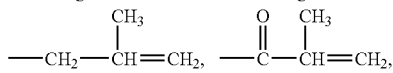

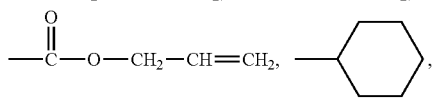

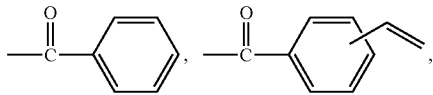

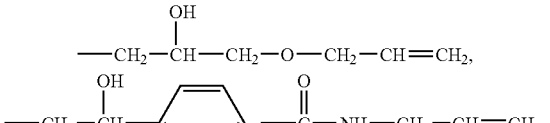

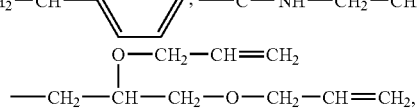

and the like.

With respect to $R^1$ in the above general formula (I), it is preferred that at least one of three $R^1$ be a monovalent organic group having 1 to 50 carbon atoms and having one or more epoxy groups, in light of possible achievement of more favorable adhesiveness between the resulting cured product and various kinds of materials, and a monovalent organic group having 1 to 50 carbon atoms and having one or more epoxy groups represented by the formula of:

[chemical formula 18]

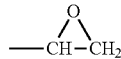

is more preferred. Examples of the preferable $R^1$ include a glycidyl group,

[chemical formula 19]

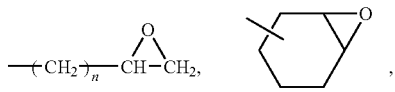   

wherein n represents an integer of 2 to 18, and the like.

$R^1$ in the above general formula (I) is preferably a monovalent organic group having 1 to 50 carbon atoms, and including no more than 2 oxygen atoms, and including only C, H and O as the constitutive element. More preferably, in light of possible improvement of chemical thermostability of the resulting cured product, $R^1$ is a monovalent hydrocarbon group having 1 to 50 carbon atoms. Examples of these preferable $R^1$ include a methyl group, an ethyl group, a propyl group, a butyl group, a phenyl group, a benzyl group, a phenethyl group, a vinyl group, an allyl group, a glycidyl group,

[chemical formula 20]

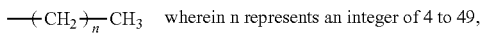 wherein n represents an integer of 4 to 49,

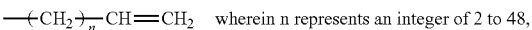 wherein n represents an integer of 2 to 48,

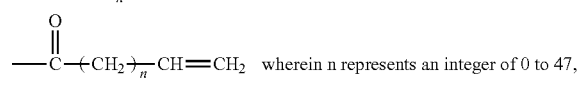 wherein n represents an integer of 0 to 47,

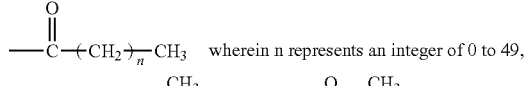 wherein n represents an integer of 0 to 49,

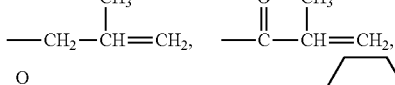

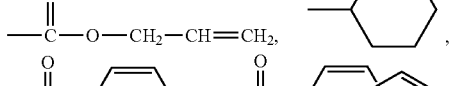

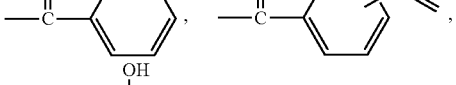

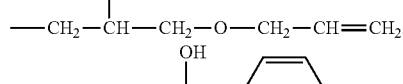

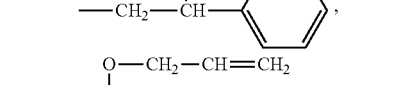

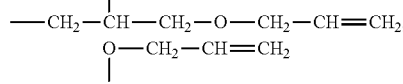

and the like.

With respect to $R^1$ in the above general formula (I), in light of possible improvement of the reactivity, at least one of three $R^1$ is preferably a monovalent organic group having 1 to 50 carbon atoms, and including one or more groups represented by:

[chemical formula 21]

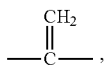

and more preferably a monovalent organic group having 1 to 50 carbon atoms, and including one or more groups represented by the following general formula (V):

[chemical formula 22]

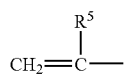
(V)

(wherein, $R^5$ represents a hydrogen atom or a methyl group). Still more preferably, at least two of three $R^1$ are an organic compound represented by the following general formula (VI):

[chemical formula 23]

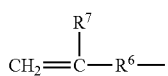
(VI)

(wherein, $R^6$ represents a direct bond or a bivalent organic group having 1 to 48 carbon atoms; $R^7$ represents a hydrogen atom or a methyl group, and wherein multiple $R^6$ and $R^7$ may be each the same or different).

Although $R^6$ in the above general formula (VI) represents a direct bond or a bivalent organic group having 1 to 48 carbon atoms, in light of possible increase of the heat resistance of the resulting cured product, $R^6$ represents preferably a direct bond or a bivalent organic group having 1 to 20 carbon atoms, more preferably a direct bond a bivalent organic group having 1 to 10 carbon atoms, and still more preferably a direct bond or a bivalent organic group having 1 to 4 carbon atoms. Examples of these preferable $R^6$ include

[chemical formula 24]

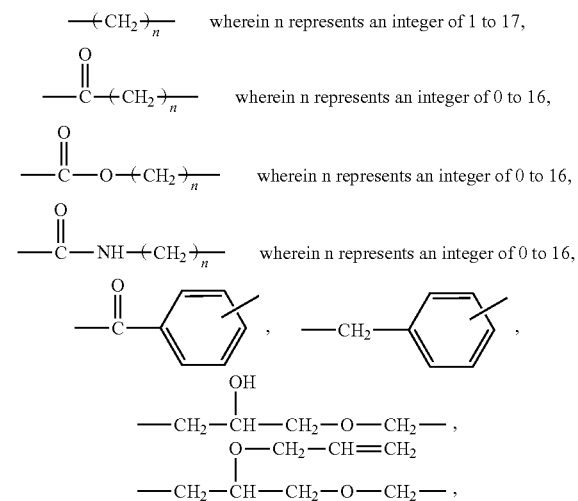

and the like.

$R^6$ in the above general formula (VI) is preferably a bivalent organic group having 1 to 48 carbon atoms, and including a direct bond or no more than two oxygen atoms and including only C, H and O as the constitutive element, and more preferably a direct bond or a bivalent hydrocarbon group having 1 to 48 carbon atoms, in light of possible improvement of chemical thermostability of the resulting cured product. Examples of these preferable $R^6$ include

[chemical formula 25]

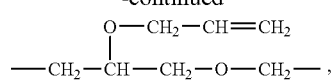

 wherein n represents an integer of 1 to 47,

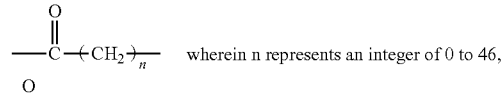 wherein n represents an integer of 0 to 46,

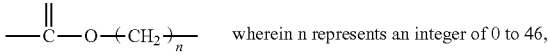 wherein n represents an integer of 0 to 46,

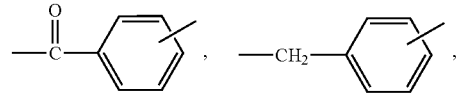

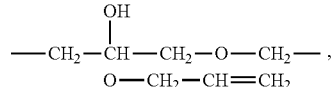

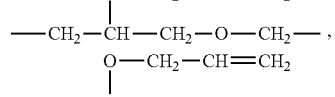

and the like.

Although $R^7$ in the above general formula (VI) is a hydrogen atom or a methyl group, it is preferably a hydrogen atom, in light of possible improvement of the reactivity.

However, also in preferable examples of the organic compound represented by the above general formula (I), it is necessary to include 2 to 6 carbon-carbon double bonds reactive with a SiH group in a molecule. In light of capability of further improving the heat resistance, the organic compound including no less than three carbon-carbon double bonds reactive with a SiH group in a molecule is more preferred.

Specific examples of the preferred organic compound represented by the general formula (I) as in the foregoing include triallyl isocyanurate,

[chemical formula 26]

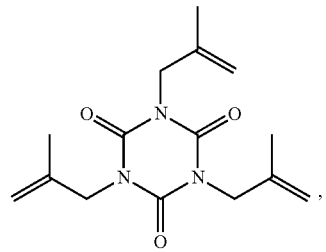

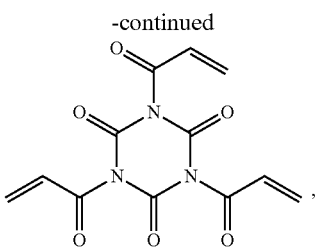

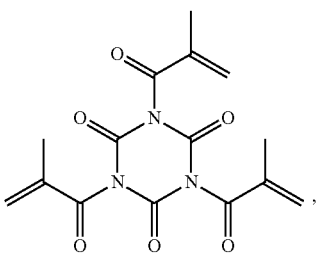

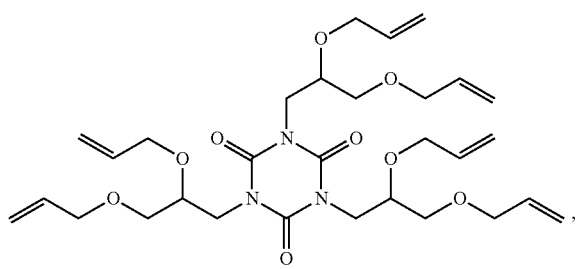

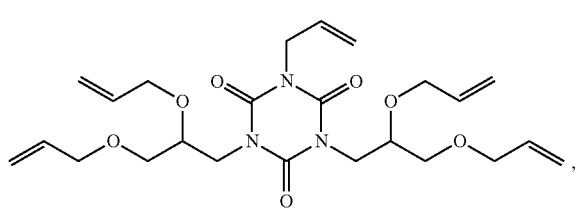

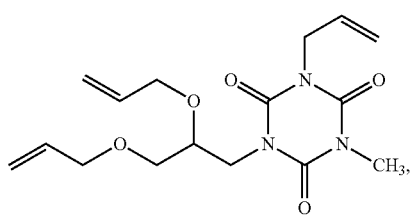

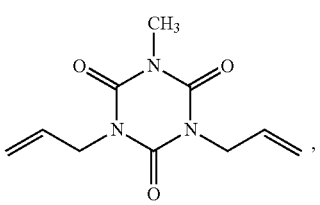

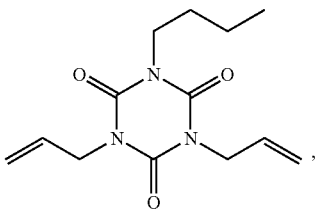

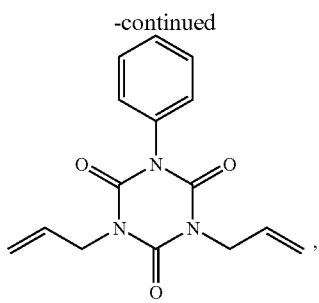

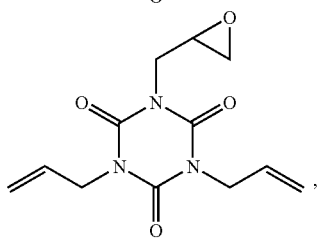

and the like.

In an attempt to improve the adhesiveness of the cured product, the compound (α1) is preferably diallyl monoglycidyl isocyanurate.

The foregoing a variety of compounds (α1) can be used alone, or as a mixture of two or more thereof.

(Compound (β1))

Next, the compound (β1) will be explained. The compound (β1) is not particularly limited as long as it is a linear and/or cyclic organopolysiloxane compound having at least two SiH groups in a molecule. For example, the compounds such as those disclosed in International Publication No. WO96/15194, and have at least two SiH groups in a molecule can be used.

Of these, in light of favorable availability and reactivity with the compound (α1), cyclic organopolysiloxane having at least three SiH groups in a molecule represented by the following general formula (II):

[chemical formula 27]

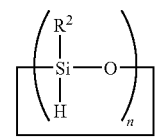

(II)

(wherein, $R^2$ represents an organic group having 1 to 6 carbon atoms; and n represents an integer of 3 to 10) are more preferred.

The substituent $R^2$ in the compound represented by the general formula (II) is preferably constituted with C, H and O, more preferably a hydrocarbon group, and even more preferably a methyl group.

The compound represented by the general formula (II) is preferably 1,3,5,7-tetramethylcyclotetrasiloxane, in light of availability and reactivity.

The foregoing a variety of compounds (β1) can be used alone, or as a mixture of two or more thereof.

(Compound (γ1))

Next, the compound (γ1) will be explained.

The compound (γ1) is not particularly limited as long as it is an organic compound having at least one epoxy group or oxetanyl group and one carbon-carbon double bond reactive with a SiH group in a molecule.

As the carbon-carbon double bond reactive with a SiH group, similar one to the carbon-carbon double bond reactive with the SiH group in the compound (α1) described above is preferred.

Examples of the epoxy group include those represented by the following general formula (VII):

[chemical formula 28]

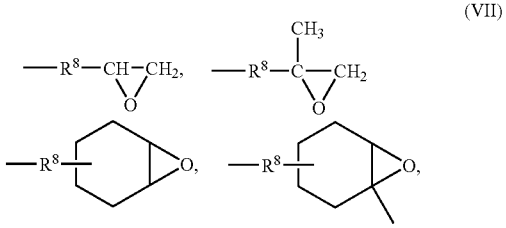
(VII)

wherein $R^8$ represents a bivalent organic group having 1 to 10 carbon atoms, and 0 to 2 oxygen atoms.

Examples of the oxetanyl group include those represented by the following general formula (VIII):

[chemical formula 29]

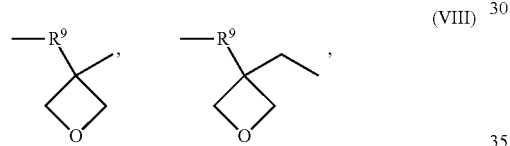
(VIII)

wherein $R^9$ represents a bivalent organic group having 1 to 10 carbon atoms, and 0 to 2 oxygen atoms.

Specific examples of the compound (γ1) include 1,2-epoxy-4-vinylcyclohexane, 3-ethyl-3-allyloxymethyloxetane, 1-allyloxy-2,3-epoxypropane, monoallyl diglycidyl isocyanurate,

[chemical formula 30]

$$R'\mathrm{-\!\!+\!\!C_2H_4O\!\!+\!\!_m\!\!+\!\!C_3H_6O\!\!+\!\!_n\!R'',}$$

wherein m represents an integer of 0 to 30; and n represents an integer of 0 to 30,

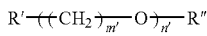

wherein m' represents an integer of 2 to 5; and n' represents an integer of 0 to 20, R':

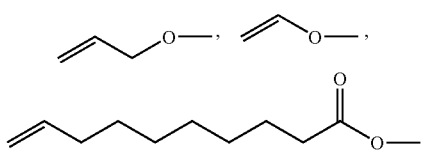

R'':

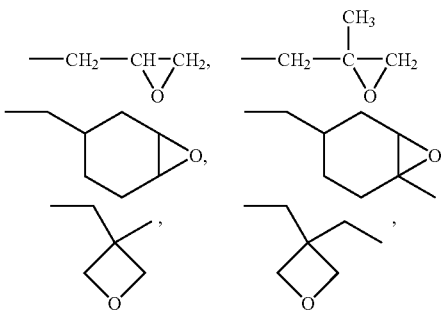

and the like.

The compound (γ1) is preferably 1-allyloxy-2,3-epoxypropane in light of the availability and heat resistance.

The compound (γ1) is preferably 1,2-epoxy-4-vinylcyclohexane in light of favorable availability and cationic polymerizability.

The compound (γ1) is preferably 1,2-epoxy-4-vinylcyclohexane, 3-ethyl-3-allyloxymethyloxetane, and 1-allyloxy-2,3-epoxypropane in light of favorable hydrosilylation reactivity with the SiH group in the compound (β1).

The foregoing a variety of compounds (γ1) can be used alone, or as a mixture of two or more thereof.

(Hydrosilylation Catalyst)

Examples of the catalyst which can be used when the compound (β1), the compound (α1), and the compound (γ1) are subjected to a hydrosilylation reaction include e.g., platinum elementary substance; supports such as alumina, silica or carbon black carrying platinum solid; chloroplatinic acid, complexes of chloroplatinic acid with alcohol, aldehyde, ketone or the like; platinum-olefin complexes (for example, $Pt(CH_2=CH_2)_2(PPh_3)_2$, $Pt(CH_2=CH_2)_2Cl_2$), platinum-vinylsiloxane complexes (for example, $Pt(ViMe_2SiOSiMe_2Vi)_n$, $Pt[(MeViSiO)_4]_m$), platinum-phosphine complexes (for example, $Pt(PPh_3)_4$, $Pt(PBu_3)_4$), platinum-phosphite complexes (for example, $Pt[P(OPh)_3]_4$, $Pt[P(OBu)_3]_4$, wherein, Me represents a methyl group; Bu represents a butyl group; Vi represents a vinyl group; Ph represents a phenyl group; n and m represent an integer); dicarbonyl dichloroplatinum; a Karstedt catalyst; a platinum-hydrocarbon complex disclosed in Ashby's U.S. Pat. Nos. 3,159,601 and 3,159,662; and a platinum alcoholate catalyst disclosed in Lamoreaux's U.S. Pat. No. 3,220,972. In addition, a platinum chloride-olefin complex disclosed in Modic's U.S. Pat. No. 3,516,946 is also useful in the present invention.

Further, examples of the catalyst other than the platinum compounds include $RhCl(PPh_3)_3$, $RhCl_3$, $RhAl_2O_3$, $RuCl_3$, $IrCl_3$, $FeCl_3$, $AlCl_3$, $PdCl_2 \cdot 2H_2O$, $NiCl_2$, $TiCl_4$, and the like.

Among these, chloroplatinic acid, a platinum-olefin complex, a platinum-vinylsiloxane complex and the like are preferred in light of the catalytic activity. Also, these catalysts can be used alone, or two or more thereof may be used in combination.

Although the amount of the added catalyst is not particularly limited, in order to provide sufficient curability, and to reduce the cost for the curable composition to be comparatively low, the lower limit of the preferable amount of addition is $10^{-8}$ mol, and more preferably $10^{-6}$ mol per mol of the SiH group in the compound (β1), while the upper limit of the preferable amount of addition is $10^{-1}$ mol, and more preferably $10^{-2}$ mol per mol of the SiH group in the compound (β1).

In addition, the catalyst described above can be used in combination with a catalytic promoter, and examples of the catalytic promoter include phosphorus based compounds such as triphenylphosphine, 1,2-diester based compounds such as dimethyl maleate, acetylene alcoholic compounds such as 2-hydroxy-2-methyl-1-butyne and 1-ethynyl-1-cyclohexanol, sulfur based compounds such as elementary substance sulfur, and the like. The amount of the added catalytic promoter is not particularly limited, but the lower limit of the preferable amount of addition is $10^{-2}$ mol, and more preferably $10^{-1}$ mol, while the upper limit of the preferable amount of addition is $10^2$ mol, and more preferably 10 mol per mol of the hydrosilylation catalyst.

(Reaction of Compound ($\alpha$1), Compound ($\beta$1), and Compound ($\gamma$1))

The modified polyorganosiloxane compound having two or more epoxy group(s) and/or oxetanyl group(s) in total in a molecule is a compound obtained by allowing an organic compound having 2 to 6 carbon-carbon double bonds reactive with a SiH group in a molecule (compound ($\alpha$1)), a linear and/or cyclic polyorganosiloxane compound having at least two SiH groups in a molecule (compound ($\beta$1)), and an organic compound having at least one epoxy group or oxetanyl group, and one carbon-carbon double bond reactive with a SiH group in a molecule (compound ($\gamma$1)) to react in the presence of a hydrosilylation catalyst.

Although various methods of the reaction of the compound ($\alpha$1), the compound ($\beta$1), and the compound ($\gamma$1) may be exemplified, preferable synthetic methods may involve the following two synthetic methods.

One is a synthetic method (A), in which after an excess compound ($\beta$1) is subjected to a hydrosilylation reaction with the compound ($\alpha$1), the unreacted compound ($\beta$1) is once removed, and the obtained reaction product of the compound ($\beta$1) and the compound ($\alpha$1) is subjected to a hydrosilylation reaction with the compound ($\gamma$1).

Another is a synthetic method (B), in which after the compound ($\beta$1) is subjected to a hydrosilylation reaction with the compound ($\gamma$1), subsequently, a hydrosilylation reaction with the compound ($\alpha$1) is allowed, and the unreacted compound is removed.

As the synthetic method, in light of favorable reactivity due to the presence of less low molecular weight materials, and to improvement of the heat and light resistance of the cured product, the synthetic method (A) is preferred.

As the synthetic method, in light of enablement of the synthesis in one pot, and excellent production cost, the synthetic method (B) is preferred.

In the synthetic method (A), the blend ratio of the compound ($\alpha$1) and the compound ($\beta$1) in the hydrosilylation reaction of the compound ($\alpha$1) and the compound ($\beta$1) is not particularly limited, but in terms of the ratio of the total number (X) of the carbon-carbon double bonds reactive with the SiH group in the compound ($\alpha$1) and the total number (Y) of the SiH groups in the mixed compound ($\beta$1), Y/X is preferably no less than 3, more preferably no less than 6, and still more preferably no less than 9, in light of low viscosity of the resulting compound, and favorable handleability.

As the method for removing the unreacted compound ($\beta$1) and/or the solvent after permitting the hydrosilylation reaction of the compound ($\alpha$1) with the compound ($\beta$1), for example, vacuum devolatilization may be exemplified. When the vacuum devolatilization is carried out, a treatment at a low temperature is preferred. The upper limit of the preferable temperature in this instance is 100° C., and more preferably 80° C. The treatment at a high temperature is likely to be accompanied by deterioration such as increase of the viscosity, and the like.

In permitting the hydrosilylation reaction of the compound ($\gamma$1) with the reaction product of the compound ($\alpha$1) and the compound ($\beta$1) after removing the unreacted compound ($\beta$1), the blend ratio of the reaction product and the compound ($\gamma$1) is not particularly limited, but in terms of the ratio of the total number (X') of the carbon-carbon double bonds reactive with the SiH group in the compound ($\gamma$1), and the total number (Y') of the SiH groups in the reaction product of the compound ($\alpha$1) and the compound ($\beta$1) after removing the unreacted compound ($\beta$1), X'/Y' is preferably no greater than ⅔, and more preferably, X'/Y' is no greater than ⅓, in light of favorable hydrosilylation reactivity of the reaction product with the compound ($\gamma$1), low viscosity of the obtained reaction product leading to favorable handleability, ease in improvement of the heat and light resistance of the cured product of the obtained reaction product, and ease in obtaining a cured product with low contractility due to the low crosslinking density of the resulting cured product. To the contrary, in light of favorable curability of the obtained reaction product, and likelihood of increase in the crosslinking density of the cured product of the obtained reaction product, the blend ratio X'/Y' is preferably no less than ⅓, and more preferably, X'/Y' is no less than ⅔.

In the synthetic method (B), the blend ratio in the hydrosilylation reaction of the compound ($\alpha$1), the compound ($\beta$1) and the compound ($\gamma$1) is not particularly limited, but in estimation in charging for the reaction, provided that the compound ($\beta$1) reacts with only one molecule of the compound ($\alpha$1) and that the average number of the compound ($\gamma$1) reacted through hydrosilylation with the SiH group in a molecule of the compound ($\beta$1) is defined as (X''), while the number of the SiH group in a molecule of the compound ($\beta$1) is defined as (Y''), the value (Y''-X'') is preferably no greater than 3.5, more preferably no greater than 3.0, and most preferably no greater than 2.5, in view of the desirable content of the compound ($\beta$1) remained unreacted in the reaction liquid after completing the hydrosilylation reaction of no higher than 5.0% of the compound ($\beta$1) used in the reaction, without gelation of the obtained reaction product. The value (X'') and (Y'') can be determined based on the weighed value in charging each of the compounds.

In the synthetic method, a variety of methods can be employed in mixing the compound ($\alpha$1), the compound ($\beta$1) and the compound ($\gamma$1), but a method in which a mixture of the compound ($\alpha$1) and/or the compound ($\gamma$1) with the catalyst is mixed with the compound ($\beta$1) is preferred. According to a method in which a mixture of the compound ($\alpha$1) and/or compound ($\gamma$1) with the compound ($\beta$1) is mixed with the catalyst, to control the reaction may be difficult. When a method in which a mixture of the compound ($\beta$1) with the catalyst is mixed with the compound ($\alpha$1) and/or the compound ($\gamma$1) is employed, deterioration may occur because of the reactivity of the compound ($\beta$1) with contaminated moisture by means of the catalyst.

Although the reaction temperature may be predetermined at any of a variety of settings, the lower limit of the preferred temperature range herein is 30° C., and more preferably 50° C., while the upper limit of the preferred temperature range is 200° C., and more preferably 150° C. When the reaction temperature is too low, the reaction time required for permitting a sufficient reaction is lengthened, while a too high reaction temperature is not practically applicable. Although the reaction may be carried out at a constant temperature, the temperature may be altered in multiple steps or continuously as needed.

Also, the reaction time, and the pressure in the reaction may be predetermined at any of a variety of settings as needed.

Oxygen can be used in the hydrosilylation reaction. Addition of oxygen to the gas phase of the reaction vessel enables promotion of the hydrosilylation reaction. In terms of the amount of the added oxygen not to exceed the lower explosion limit, it is necessary to control the concentration by volume of the oxygen in the gas phase to be no greater than 3%. In light of the development of the effect to promote the hydrosilylation reaction by adding oxygen, the concentration by volume of oxygen in the gas phase is preferably no less than 0.1%, and more preferably no less than 1%.

A solvent may be also used in the hydrosilylation reaction. The solvent which can be used in not particularly limited as long as it does not inhibit the hydrosilylation reaction, and specific illustrative examples of the solvent which can be suitably used include hydrocarbon based solvents such as benzene, toluene, hexane and heptane, ether based solvents such as tetrahydrofuran, 1,4-dioxane, 1,3-dioxolane and diethyl ether, ketone based solvents such as acetone and methyl ethyl ketone, halogen based solvents such as chloroform, methylene chloride and 1,2-dichloroethane, and the like. These solvents may be also used as a mixed solvent of two or more kinds thereof. The solvent is preferably toluene, tetrahydrofuran, 1,3-dioxolane or chloroform. The amount of the used solvent can be also predetermined ad libitum.

After permitting the hydrosilylation reaction of the compound ($\alpha$1), the compound ($\beta$1) and the compound ($\gamma$1), the solvent and/or the unreacted compound can be also removed. Since the obtained reaction product does not include the volatile matter owing to the removal of these volatile matters, problems of generation of void and crack resulting from volatilization of the volatile matter hardly occur when the cured product is formed using this reaction product. The method for the removal may involve, for example, vacuum devolatilization. When the vacuum devolatilization is carried out, a treatment at a low temperature is preferred. The upper limit of the preferable temperature in this instance is 100° C., and more preferably 80° C. The treatment at a high temperature is likely to be accompanied by deterioration such as increase of the viscosity, and the like.

In the process for production of the present invention, various additives can be used to meet needs.

(Gelation Inhibitor)

For the purpose of improving the storage stability of the obtained reaction product, or for the purpose of inhibiting deterioration such as increase of the viscosity and the like resulting from the heat treatment when the solvent and/or the unreacted compound are removed by vacuum devolatilization after permitting the hydrosilylation reaction of the compound ($\alpha$1), the compound ($\beta$1) and the compound ($\gamma$1), a gelation inhibitor can be used. Examples of the gelation inhibitor include compounds having an aliphatic unsaturated bond, organic phosphorus compounds, organic sulfur compounds, nitrogen-containing compounds, tin based compounds, organic peroxide, and the like. These may be used in combination.

Illustrative examples of the compounds having an aliphatic unsaturated bond include propargyl alcohols such as 3-hydroxy-3-methyl-1-butyne, 3-hydroxy-3-phenyl-1-butyne and 1-ethynyl-1-cyclohexanol, ene-ine compounds, maleic acid esters such as dimethyl maleate, and the like. Illustrative examples of the organic phosphorus compound include triorganophosphines, diorganophosphines, organophosphones, triorganophosphites, and the like. Illustrative examples of the organic sulfur compound include organomercaptans, diorganosulfides, hydrogen sulfide, benzothiazole, thiazole, benzothiazole disulfide, and the like. Illustrative examples of the tin based compound include stannous halogen dihydrate, stannous carboxylate, and the like. Illustrative examples of the organic peroxide include di-t-butyl peroxide, dicumyl peroxide, benzoyl peroxide, t-butyl perbenzoate, and the like.

Among these gelation inhibitors, benzothiazole, thiazole, dimethyl maleate, 3-hydroxy-3-methyl-1-butyne, 1-ethynyl-1-cyclohexanol, and triphenylphosphine are preferred in light of favorable retarding activity and superior availability of the raw material.

Although the amount of the added gelation inhibitor may be predetermined at any of a variety of settings, the lower limit of the preferable amount of addition per mol of the used hydrosilylation catalyst is $10^{-1}$ mol, and more preferably 1 mol, while the upper limit of the preferable amount of addition is $10^3$ mol, and more preferably $10^2$ mol. When the amount of addition is too small, desired storage stability and the effect of gelation inhibition in vacuum devolatilization cannot be achieved. When the amount of addition is too large, the agent can serve as a curing inhibitor in the curing reaction.

Also, these gelation inhibitors may be used alone, or in combination of two or more thereof.

Examples of the modified polyorganosiloxane compound which is a hydrosilylation reaction product of the compound ($\alpha$1), the compound ($\beta$1) and the compound ($\gamma$1) as described above include a reaction product of triallyl isocyanurate, 1,3,5,7-tetramethylcyclotetrasiloxane and 1,2-epoxy-4-vinylcyclohexane, a reaction product of triallyl isocyanurate, 1,3,5,7-tetramethylcyclotetrasiloxane and 1-allyloxy-2,3-epoxypropane, a reaction product of triallyl isocyanurate, 1,3,5,7-tetramethylcyclotetrasiloxane and 3-ethyl-3-allyloxymethyloxetane, a reaction product of diallyl monoglycidyl isocyanurate, 1,3,5,7-tetramethylcyclotetrasiloxane and 1,2-epoxy-4-vinylcyclohexane, a reaction product of diallyl monoglycidyl isocyanurate, 1,3,5,7-tetramethylcyclotetrasiloxane and 1-allyloxy-2,3-epoxypropane, a reaction product of diallyl monoglycidyl isocyanurate, 1,3,5,7-tetramethylcyclotetrasiloxane and 3-ethyl-3-allyloxymethyloxetane, a reaction product of divinylbenzene, 1,3,5,7-tetramethylcyclotetrasiloxane and 1,2-epoxy-4-vinylcyclohexane, a reaction product of divinylbenzene, 1,3,5,7-tetramethylcyclotetrasiloxane and 1-allyloxy-2,3-epoxypropane, a reaction product of divinylbenzene, 1,3,5,7-tetramethylcyclotetrasiloxane and 3-ethyl-3-allyloxymethyloxetane, a reaction product of bisphenol A diallyl ether, 1,3,5,7-tetramethylcyclotetrasiloxane and 1,2-epoxy-4-vinylcyclohexane, a reaction product of bisphenol A diallyl ether, 1,3,5,7-tetramethylcyclotetrasiloxane and 1-allyloxy-2,3-epoxypropane, a reaction product of bisphenol A diallyl ether, 1,3,5,7-tetramethylcyclotetrasiloxane and 3-ethyl-3-allyloxymethyloxetane, a reaction product of 1,2,4-trivinylcyclohexane, 1,3,5,7-tetramethylcyclotetrasiloxane and 1,2-epoxy-4-vinylcyclohexane, a reaction product of 1,2,4-trivinylcyclohexane, 1,3,5,7-tetramethylcyclotetrasiloxane and 1-allyloxy-2,3-epoxypropane, a reaction product of 1,2,4-trivinylcyclohexane, 1,3,5,7-tetramethylcyclotetrasiloxane and 3-ethyl-3-allyloxymethyloxetane, a reaction product of dicyclopentadiene, 1,3,5,7-tetramethylcyclotetrasiloxane and 1,2-epoxy-4-vinylcyclohexane, a reaction product of dicyclopentadiene, 1,3,5,7-tetramethylcyclotetrasiloxane and 1-allyloxy-2,3-epoxypropane, a reaction product of dicyclopentadiene, 1,3,5,7-tetramethylcyclotetrasiloxane and 3-ethyl-3-allyloxymethyloxetane, a reaction product of 1,3,5-tris(allyloxy)adamantane, 1,3,5,7-tetramethylcyclotetrasiloxane and 1,2-epoxy-4-vinylcyclohexane, a reaction product of 1,3,5-tris(allyloxy)adamantane, 1,3,5,7-tetramethylcyclotetrasiloxane and 1-allyloxy-2,3-epoxypropane, a reaction product of 1,3,5-tris(allyloxy)adamantane, 1,3,5,7-tetramethylcyclotetrasiloxane and 3-ethyl-3-allyloxymethyloxetane, and the like.

Of these reaction products, in light of favorable heat and light resistance of the cured product, a reaction product of triallyl isocyanurate, 1,3,5,7-tetramethylcyclotetrasiloxane and 1,2-epoxy-4-vinylcyclohexane, a reaction product of triallyl isocyanurate, 1,3,5,7-tetramethylcyclotetrasiloxane and 1-allyloxy-2,3-epoxypropane, and a reaction product of diallyl monoglycidyl isocyanurate, 1,3,5,7-tetramethylcyclotetrasiloxane and 1,2-epoxy-4-vinylcyclohexane, a reaction product of diallyl monoglycidyl isocyanurate, 1,3,5,7-tetramethylcyclotetrasiloxane and 1-allyloxy-2,3-epoxypropane are preferred.

These reaction products can be used alone, or as a mixture of two or more thereof.

(Curable Composition)

The curable composition of the present invention contains the modified polyorganosiloxane compound of the present invention, and a cation polymerization initiator. As the modified polyorganosiloxane compound, the modified polyorganosiloxane compounds as described above can be used, and these may be used alone, or in combination of two or more thereof.

(Cation Polymerization Initiator)

As the cation polymerization initiator, an active energy ray cation polymerization initiator that generates cation species or Lewis acid by means of an active energy ray, or a thermal cation polymerization initiator that generates cation species or Lewis acid by means of heat can be used without particular limitation.

The active energy ray cation polymerization initiator includes one or more of: metal fluoroboron complex salts and boron trifluoride complex compounds as described in U.S. Pat. No. 3,379,653; bis(perfluoroalkylsulfonyl)methane metal salts as described in U.S. Pat. No. 3,586,616; aryl diazonium compounds as described in U.S. Pat. No. 3,708,296; aromatic onium salts of a VIa group element as described in U.S. Pat. No. 4,058,400; aromatic onium salts of a Va group element as described in U.S. Pat. No. 4,069,055; dicarbonyl chelate of a IIIa to Va group element as described in U.S. Pat. No. 4,086,091; thiopyrylium salts as described in U.S. Pat. No. 4,139,655; VIb elements in the form of an MF6$^-$ anion (wherein, M is selected from phosphorus, antimony and arsenic) as described in U.S. Pat. No. 4,161,478; aryl sulfonium complex salts as described in U.S. Pat. No. 4,231,951; aromatic iodonium complex salts and aromatic sulfonium complex salts as described in U.S. Pat. No. 4,256,828; bis[4-(diphenylsulfonio)phenyl]sulfide-bis-hexafluorometal salts (for example, phosphoric acid salt, arsenic acid salt, antimonic acid salt, and the like) as described in "Journal of Polymer Science, published by Polymer Chemistry", Vol. 22, p. 1789 (1984) by W. R. Watt et al.; and aromatic iodonium complex salts and aromatic sulfonium complex salts in which the anion is $B(C_6F_5)_4^-$.

Preferable cation based active energy ray cation polymerization initiator may include an aryl sulfonium complex salt, an aromatic sulfonium or an iodonium salt of a halogen-containing complex ion, and an aromatic onium salt of a II group, V group or VI group element. Some of these salts are available as a commercial product in the name of FX-512 (3M Company), UVR-6990 and UVR-6974 (Union Carbide Corporation), UVE-1014 and UVE-1016 (General Electric Company), KI-85 (Degussa GmbH), SP-152 and SP-172 (Asahi Denka Kogyo K.K.) and San-Aid SI-60L, SI-80L and SI-100L (Sanshin Chemical Industry Co., Ltd.), WPI113 and WPI116 (Wako Pure Chemical Industries, Ltd.), RHODORSIL PI2074 (Rhodia Limited).

As the thermal cation polymerization initiator, a cation based or protonic acid catalyst such as a sulfonium salt, an ammonium salt, a pyridinium salt, a phosphonium salt, an iodonium salt, a triflic acid salt, a boron trifluoride ether complex compound, boron trifluoride or the like can be used. Because high stability is kept until a cation species is generated by heating, they can be referred to as a latent curing catalyst. It has been known that the polymerization activity varies depending on the type of the substituent, and the type of anion of the onium salt, and in particular, the anion has a higher polymerization activity in the order of: $BF_4^- < AsF_6^- < PF_6^- < SbF_6^- < B(C_6F_5)_4^-$. In addition, a particular phenol compound such as, an aluminum complex and a silanol compound, and an aluminum complex and bisphenol S, has been known to serve as a cation polymerization catalyst.

Moreover, among aromatic onium salts also used as an active energy ray cation polymerization initiator, some generate the cation species by heating, and thus these can be also used as the thermal cation polymerization initiator. Examples of such an agent include San-Aid SI-60L, SI-80L and SI-100L (Sanshin Chemical Industry Co., Ltd.), WPI116 (Wako Pure Chemical Industries, Ltd.), RHODORSIL PI2074 (Rhodia Limited), and the like.

Among the cation polymerization initiators described above, in light of excellent curability and compatibility with the modified polyorganosiloxane compound having an epoxy group and/or an oxetanyl group, the boron based aromatic iodonium salt or the antimony based aromatic iodonium salt is preferred.

As the boron based aromatic iodonium salt, one represented by the following general formula (IX):

[chemical formula 31]

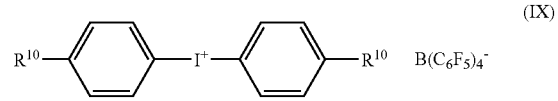

(wherein, $R^{10}$ represents $-CH(CH_3)_2$, $-C(CH_3)_3$, $-C_nH_{2n+1}$ (n=0 to 20), $-OC_nH_{2n+1}$ (n=1 to 20), and each $R^{10}$ may be the same or different) can be used.

Among the boron based aromatic iodonium salts, RHODORSIL PI2074 (Rhodia Limited) is preferred in light of the availability.

As the antimony based aromatic iodonium salt, one represented by the following general formula (X):

[chemical formual 32]

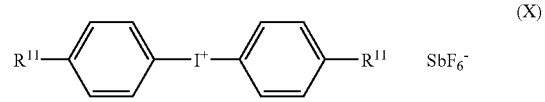

(wherein, $R^{11}$ represents $-CH(CH_3)_2$, $-C(CH_3)_3$, $-C_nH_{2n+1}$ (n=0 to 20), $-OC_nH_{2n+1}$ (n=1 to 20), and each $R^{11}$ may be the same or different) can be used.

Among the antimony based aromatic iodonium salts, WPI116 (Wako Pure Chemical Industries, Ltd.) is preferred in light of the availability. Of the cation polymerization initiators described above, the phosphorus based aromatic iodonium salts are preferred in terms of low toxicity and excellent versatility.

As the phosphorus based aromatic iodonium salt, one represented by the following general formula (XI):

[chemical formual 33]

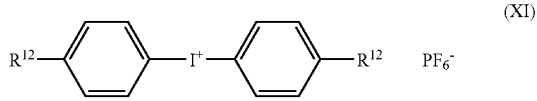

(XI)

(wherein, $R^{12}$ represents —CH(CH$_3$)$_2$, —C(CH$_3$)$_3$, —C$_n$H$_{2n+1}$ (n=0 to 20), —OC$_n$H$_{2n+1}$ (n=1 to 20), and each $R^{12}$ may be the same or different) can be used.

Among the phosphorus based aromatic iodonium salts, WPI113 (Wako Pure Chemical Industries, Ltd.) is preferred in light of the availability.

The amount of the used cation polymerization initiator may be preferably 0.01 to 1.0 parts by weight, and more preferably 0.05 to 0.5 parts by weight per 100 parts by weight of the modified polyorganosiloxane compound. When the amount of the cation polymerization initiator is small, a long time period may be required for curing, or sufficiently cured product may not be obtained. Too large amount of the cation initiator is not preferred since the color of the initiator may remain in the cured product, coloring or protrusion may occur due to rapid curing, and the heat and light resistance of the cured product may be impaired.

(Organic Compound Having at Least One Cation Polymerizable Functional Group)

The curable composition of the present invention may further contain an organic compound having at least one cation polymerizable functional group, in addition to the modified polyorganosiloxane compound of the present invention and the cation polymerization initiator. These compounds can be used as a reactivity diluent, a resin strengthening agent, an adhesiveness improver and the like, and the effects such as lowering of the viscosity, resin strengthening, improvement of the adhesiveness and the like can be exerted to meet the needs.

Examples of the organic compound having at least one cation polymerizable functional group include epoxy compounds, oxetane compounds, and vinyl ether compounds.

Examples of the cation polymerizable functional group include alicyclic epoxy groups, a glycidyl group, an oxetanyl group, a vinyl ether group, and the like.

Among these cation polymerizable functional groups, the alicyclic epoxy group, and the oxetanyl group are preferred as the functional group that is superior in providing cation curability through including in the modified polyorganosiloxane compound of the present invention.

The number of the functional group per molecule of these cation polymerizable functional groups is preferably two or more, and more preferably three or more per molecule in view of the improvement of the resin strength, and low incidence of impairment of the heat-resistant and light-resistant transparency of the cured product through elevation of the glass transition temperature.

Specific examples of the organic compound having at least one cation polymerizable functional group include e.g., novolak phenol type epoxy resins, biphenyl type epoxy resins, dicyclopentadiene type epoxy resins, epoxidized polybutadiene, bisphenol F diglycidyl ether, bisphenol A diglycidyl ether, 2,2'-bis(4-glycidyloxycyclohexyl)propane, 3,4-epoxycyclohexylmethyl-3',4'-epoxycyclohexane carboxylate, vinylcyclohexenedioxide, 1-methyl-4-(2-methyloxiranyl)-7-oxabicyclo[4.1.0]heptane, 2-(3,4-epoxycyclohexyl)-5,5-spiro-(3,4-epoxycyclohexane)-1,3-dioxane, bis(3,4-epoxycyclohexyl)adipate, 1,2-cyclopropane dicarboxylic acid bisglycidyl ester, triglycidyl isocyanurate, monoallyl diglycidyl isocyanurate, diallyl monoglycidyl isocyanurate, 1,4-bis{[(3-ethyl-3-oxetanyl)methoxy]methyl}benzene, bis[1-ethyl(3-oxetanyl)]methyl ether, 3-ethyl-3-(phenoxymethyl)oxetane, 3-ethyl-3-(2-ethyl hexyloxymethyl)oxetane, cyclohexyl vinyl ether, 1,4-butanediol divinyl ether, nonanediol divinyl ether, cyclohexanediol divinyl ether, cyclohexanedimethanol divinyl ether, and the like.

Among these organic compounds having at least one cation polymerizable functional group, in view of favorable compatibility with the modified polyorganosiloxane compound of the present invention, and capability of lowering of the viscosity of the curable composition, thereby leading to superior cation curability, 1,4-bis{[(3-ethyl-3-oxetanyl)methoxy]methyl}benzene, bis[1-ethyl(3-oxetanyl)]methyl ether, and 3,4-epoxycyclohexenylmethyl-3,4'-epoxycyclohexenecarboxylate are preferred.

The amount of the added organic compound having at least one cation polymerizable functional group may be predetermined at any of a variety of settings, but the preferred amount of addition may be 1 to 100 parts by weight, and more preferably 10 to 50 parts by weight per 100 parts by weight of the modified polyorganosiloxane compound. When the amount of addition is too small, desired effects of lowering the viscosity, strengthening the resin, and improving the adhesiveness may not be exhibited. To the contrary, when the amount of addition is too large, adverse influences may be exerted on physical properties of the cured product. Also, these organic compounds having at least one cation polymerizable functional group may be used alone, or in combination of two or more thereof.

(Additive)

The curable composition of the present invention can include a variety of additives in the range not to compromise the object and the effect of the present invention, in addition to the modified polyorganosiloxane compound, the cation polymerization initiator, and the organic compound having at least one cation polymerizable functional group described above.

(Phosphorus Compound)

When the curable composition of the present invention is cured by light or heat, and is used in applications in which transparency is particularly desired, to use a phosphorus compound is preferred for improving the hue after curing by the light or heat. Specific examples of the phosphorus compound which can be preferably used include oxidation inhibitors selected from phosphites such as triphenylphosphite, diphenylisodecylphosphite, phenyldiisodecylphosphite, tris(nonylphenyl)phosphite, diisodecylpentaerythritoldiphosphite, tris(2,4-di-t-butylphenyl)phosphite, cyclic neopentanetetraylbis(octadecyl phosphite), cyclic neopentanetetraylbis(2,4-di-t-butylphenyl)phosphite, cyclic neopentanetetraylbis(2,6-di-t-butyl-4-methylphenyl)phosphite and bis[2-t-butyl-6-methyl-4-{2-(octadecyloxycarbonyl)ethyl}phenyl] hydrogen phosphite, and coloring inhibitors selected from oxaphosphaphenanthrene oxides such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-desiloxy-9,10-dihydro-9-oxa-10-phosphaphenanthrene-10-oxide.

The amount of the used phosphorus compound is preferably 0.01 to 10 parts by weight, and more preferably 0.1 to 5 parts by weight per 100 parts by weight of the modified polyorganosiloxane compound. When the using amount of the phosphorus compound is less than 0.01 parts by weight, the effect of improving the hue may be decreased. When the using amount is more than 10 parts by weight, adverse influences may be exerted on the curability or physical properties of the cured product.

(Adhesiveness Improver)

An adhesiveness improver can be also added to the composition of the present invention. As the adhesiveness improver, for example, various coupling agents, phenol resins, coumarone-indene resins, rhodine ester resins, terpene-phenol resins, α-methylstyrene-vinyltoluene copolymers, polyethylmethylstyrene, aromatic polyisocyanate, and the like can be exemplified in addition to generally used adhesives. As described above, the epoxy compound or the oxetane compound illustrated as the organic compound having at least one cation polymerizable functional group can be also used as the adhesiveness improver, and use thereof in combination with the adhesiveness improver is also permitted.

As the coupling agent, for example, a silane coupling agent may be exemplified. The silane coupling agent is not particularly limited as long as it is a compound having each at least one functional group reactive with an organic group and at least one hydrolyzable silicon group, in a molecule. The group reactive with an organic group is preferably at least one functional group selected from an epoxy group, a methacryl group, an acryl group, an isocyanate group, an isocyanurate group, a vinyl group, and a carbamate group in light of the handleability, and particularly preferably an epoxy group, a methacryl group and an acryl group in light of the curability and adhesiveness. The hydrolyzable silicon group is preferably an alkoxysilyl group in light of the handleability, and particularly preferably a methoxysilyl group or an ethoxysilyl group in light of the reactivity.

Illustrative examples of the preferable silane coupling agent include alkoxysilanes having an epoxy functional group such as 3-glycidoxypropyltrimethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane; alkoxysilanes having a methacryl group or an acryl group such as 3-methacryloxypropyltrimethoxysilane, 3-methacryloxypropyltriethoxysilane, 3-acryloxypropyltrimethoxysilane, 3-acryloxypropyltriethoxysilane, methacryloxymethyltrimethoxysilane, methacryloxymethyltriethoxysilane, acryloxymethyltrimethoxysilane, and acryloxymethyltriethoxysilane.

Although the amount of added silane coupling agent may be predetermined at any of a variety of settings, it is preferably 0.1 to 20 parts by weight, more preferably 0.3 to 10 parts by weight, and even more preferably 0.5 to 5 parts by weight per 100 parts by weight of the modified polyorganosiloxane compound. When the amount of addition is too small, the effect of improving the adhesiveness cannot be exhibited, while when the amount of addition is too large, adverse influences may be exerted on the curability or the physical properties of the cured product.

Also, these coupling agents, silane coupling agents and the like may be used alone, or in combination of two or more thereof.

According to the present invention, carboxylic acids and/or acid anhydrides can be used for the purpose of improving the effect of the coupling agent, the epoxy compound, the oxetane compound and the like, and thus improvement of the adhesiveness and/or stabilization is enabled. Such carboxylic acids, acid anhydrides are not particularly limited, and examples of the same include

[chemical formula 34]

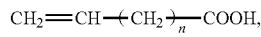

wherein n represents an integer of 0 to 30,

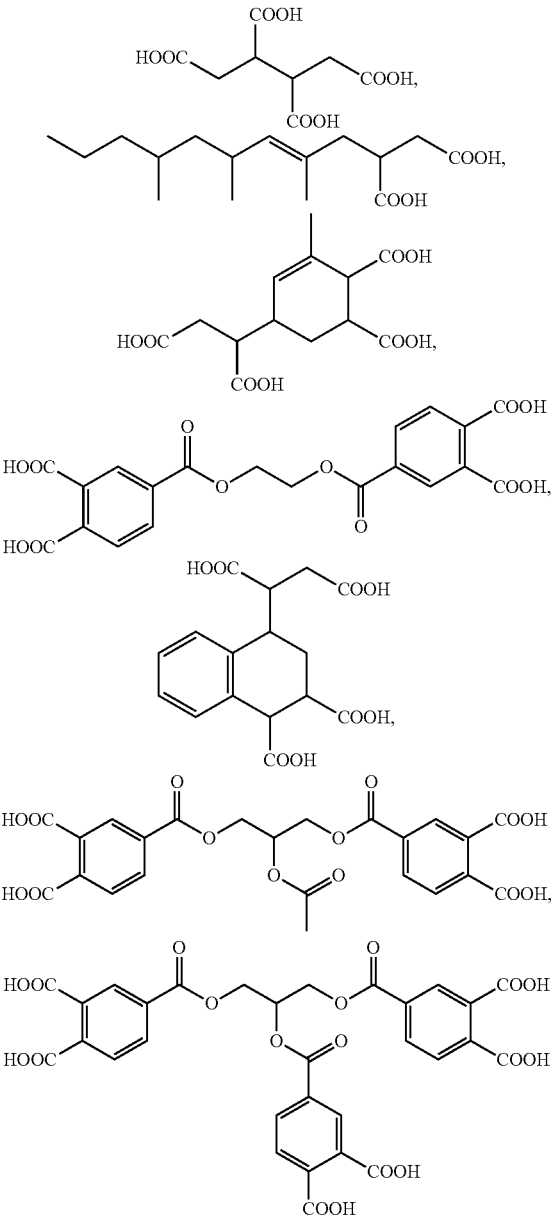

2-ethylhexanoic acid, cyclohexanecarboxylic acid, cyclohexanedicarboxylic acid, methylcyclohexanedicarboxylic acid, tetrahydrophthalic acid, methyltetrahydrophthalic acid, methylhimic acid, norbornenedicarboxylic acid, hydrogenated methylnadic acid, maleic acid, acetylenedicarboxylic acid, lactic acid, malic acid, citric acid, tartaric acid, benzoic acid, hydroxybenzoic acid, cinnamic acid, phthalic acid, trimellitic acid, pyromellitic acid, naphthalenecarboxylic acid, naphthalenedicarboxylic acid, and simple or complex acid anhydride of the same.

Among these carboxylic acids and/or acid anhydrides, preferable carboxylic acids and/or acid anhydrides in terms of low probability of impairment of the physical properties of the resulting cured product include, for example, tetrahydrophthalic acid, methyltetrahydrophthalic acid, and simple or complex acid anhydride of the same, and the like.

When the carboxylic acids and/or acid anhydrides are used, their amount may be predetermined at any of a variety of settings, and the range of the preferred amount per 100 parts by weight of the coupling agent and/or epoxy compound and/or oxetane compound is 0.1 to 50 parts by weight, and more preferably 1 to 10 parts by weight. When the amount of addition is too small, the effect of improving the adhesiveness cannot be exhibited, while when the amount of addition is too large, adverse influences may be exerted on physical properties of the cured product.

Also, these carboxylic acids or/and acid anhydrides may be used alone, or two or more thereof may be used in combination.

(Thermoplastic Resin)

A variety of thermoplastic resins can be also added to the curable composition for the purpose of improving the characteristic. Although any of various thermoplastic resins can be used, illustrative examples include e.g., polymethyl methacrylate based resins such as homopolymers of methyl methacrylate, or random, block or graft polymers of methyl methacrylate and other monomer (for example, Optrez® manufactured by Hitachi Chemical Co., Ltd., and the like); acrylic resins typified by polybutyl acrylate based resins such as homopolymers of butyl acrylate, or random, block or graft polymers of butyl acrylate and other monomer; polycarbonate based resins such as polycarbonate resins including bisphenol A, 3,3,5-trimethylcyclohexylidenebisphenol or the like as a monomer structure (for example, APEC manufactured by Teijin Limited, and the like); resins obtained by homopolymerization or copolymerization of a norbornene derivative, a vinyl monomer or the like; cycloolefin based resins such as resins obtained by ring opening metathesis polymerization of a norbornene derivative, or hydrogenated products thereof (for example, APEL manufactured by Mitsui Chemicals, Inc., ZEONOR, ZEONEX manufactured by Nippon ZEON Co., Ltd., ARTON manufactured by JSR Corporation, and the like); olefin-maleimide based resins such as copolymers of ethylene and maleimide (for example, TI-PAS manufactured by Tosoh Corporation, and the like), polyester based resins such as polyesters obtained by polycondensation of a bisphenol such as bisphenol A or bis(4-(2-hydroxyethoxy)phenyl)fluorine, or a diol such as diethylene glycol, with a phthalic acid such as terephthalic acid or isophthalic acid, or an aliphatic dicarboxylic acid (for example, O-PET manufactured by Kanebo, Ltd., and the like); polyethersulfone resins, polyallylate resins, polyvinyl acetal resins, polyethylene resins, polypropylene resins, polystyrene resins, polyamide resins, silicone resins, fluorene resins, and the like, as well as rubber resins such as natural rubbers, EPDM, but not limited thereto.

The thermoplastic resin may have a functional group (epoxy group, hydroxyl group, carboxyl group, acid anhydride, alkoxylsilane) reactive with the epoxy group or the oxetanyl group in a molecule. Because the resulting cured product is likely to be further tough, one or more, on average, functional group(s) reactive with the epoxy group or the oxetanyl group (i.e., epoxy group, hydroxyl group, carboxyl group, acid anhydride, alkoxylsilane) is/are preferably included in a molecule.

The thermoplastic resin may also have other crosslinkable group. Exemplary crosslinkable groups herein include an epoxy group, an amino group, radical polymerizable unsaturated groups, a carboxyl group, an isocyanate group, a hydroxyl group, alkoxysilyl groups, and the like. Because the resulting cured product is likely to have higher heat resistance, one or more crosslinkable group on average is preferably included in a molecule.

Although the molecular weight of the thermoplastic resin is not particularly limited, in light of the capability of achieving a favorable compatibility with the modified organosiloxane compound, the number average molecular weight is preferably no higher than 10,000, and more preferably no higher than 5,000. In contrast, the number average molecular weight is preferably no lower than 10,000, and more preferably no lower than 100,000 because the resulting cured product is more likely to be tough. The molecular weight distribution is not also limited in particular, but the molecular weight distribution is preferably no greater than 3, more preferably no greater than 2, and even more preferably no greater than 1.5 because it is likely that the viscosity of the mixture is decreased, whereby the formability becomes favorable.

Although the compounding proportion of the thermoplastic resin is not particularly limited, the range of the preferred proportion is 5 to 50% by weight, and more preferably 10 to 30% by weight in the entire curable composition. When the added amount is too small, the resulting cured product is likely to be fragile. When the added amount is too large, the heat resistance (modulus of elasticity at high temperature) is likely to be decreased.

The thermoplastic resin may be used singly, or multiple kinds of the resin may be also used in combination.

The thermoplastic resin may be dissolved in the modified organosiloxane compound to give a mixture in a uniform state; or may be pulverized and mixed in a particulate form; or may form a dispersed state by dissolving in a solvent followed by mixing or the like. Because the resulting cured product is likely to be more transparent, to dissolve in the modified organosiloxane compound and give a mixture in a uniform state is preferred. Also in this instance, the thermoplastic resin may be directly dissolved in the modified organosiloxane compound; or may be uniformly mixed with a solvent or the like, and thereafter may remove the solvent to give a uniformly dispersed state and/or mixed state.

When the dispersed thermoplastic resin is used, the mean particle size may be predetermined at any of a variety of settings, however, the lower limit of the preferable mean particle size is 10 nm, while the upper limit of the preferable mean particle size is 10 μm. The particle diameter distribution may be present, and either monodispersion, or the existence of multiple peaks of the particle size is acceptable. However, it is preferred that the coefficient of variation of the particle size is no greater than 10% because it is likely that the viscosity of the curable composition is decreased, whereby the formability becomes favorable.

(Filler)

A filler may be added to the curable composition as needed. Although a variety of fillers can be used, for example, silica based fillers such as quartz, fume silica, precipitated silica, silicic acid anhydride, fused silica, crystalline silica, and superfine amorphous silica; inorganic fillers such as silicon nitride, silver powder, alumina, aluminum hydroxide, titanium oxide, glass fiber, carbon fiber, mica, carbon black, graphite, diatomaceous earth, white earth, clay, talc, calcium carbonate, magnesium carbonate, barium sulfate, and inorganic balloon, as well fillers commonly used and/or proposed as conventional encapsulant filler such as epoxy based fillers, and the like may be exemplified.

(Anti-Aging Agent)

An anti-aging agent may also be added to the curable composition obtained in the present invention. As the anti-aging agent, in addition to commonly used anti-aging agents such as hindered phenol based anti-aging agent, citric acid, phosphoric acid, sulfur based anti-aging agent, and the like may be exemplified. As the hindered phenol based anti-aging agent, a variety of the agents can be used, in addition to Irganox 1010 available from Ciba Specialty Chemicals Ltd. As the sulfur based anti-aging agent, mercaptans, and salts of mercaptan, sulfides including sulfide carboxylic acid esters and hindered phenol based sulfides, polysulfides, dithiocarboxylic acid salts, thioureas, thiophosphates, sulfonium compounds, thioaldehydes, thioketones, mercaptals, mercaptols, monothio acids, polythio acids, thioamides, sulfoxides, and the like may be exemplified. Also, these anti-aging agents may be used alone, or two or more thereof may be used in combination.

(Radical Inhibitor)

A radical inhibitor may be also added to the curable composition obtained in the present invention. As the radical inhibitor, for example, phenol based radical inhibitors such as 2,6-di-t-butyl-3-methylphenol (BHT), 2,2'-methylene-bis(4-methyl-6-t-butylphenol), and tetrakis(methylene-3(3,5-di-t-butyl-4-hydroxyphenyl)propionate)methane, amine based radical inhibitors such as phenyl-β-naphthylamine, α-naphthylamine, N,N'-secondary butyl-p-phenylenediamine, phenothiazine, and N,N'-diphenyl-p-phenylenediamine, and the like may be exemplified. Also, these radical inhibitors may be used alone, or two or more thereof may be used in combination.

(Ultraviolet Ray Absorbing Agent)

An ultraviolet ray absorbing agent may be also added to the curable composition obtained in the present invention. As the ultraviolet ray absorbing agent, for example, 2(2'-hydroxy-3',5'-di-t-butylphenyl)benzotriazole, bis(2,2,6,6-tetramethyl-4-piperidine)sebacate, and the like may be exemplified. Also, these ultraviolet ray absorbing agents may be used alone, or two or more thereof may be used in combination.

(Solvent)

When the obtained reaction product has a high viscosity, it can be also used after dissolving in a solvent. The solvent which can be used is not particularly limited, and illustrative examples which can be suitably used include, specifically, hydrocarbon based solvents such as benzene, toluene, hexane, and heptane, ether based solvents such as tetrahydrofuran, 1,4-dioxane, 1,3-dioxolane, and diethyl ether, ketone based solvents such as acetone, methyl ethyl ketone, methyl isobutyl ketone, and cyclohexanone, glycol based solvents such as propyleneglycol-1-monomethyl ether-2-acetate (PG-MEA), and ethylene glycol diethyl ether, halogen based solvents such as chloroform, methylene chloride, and 1,2-dichloroethane. Toluene, tetrahydrofuran, 1,3-dioxolane, propyleneglycol-1-monomethyl ether-2-acetate, and chloroform are preferred as the solvent. Although the amount of the used solvent can be determined ad libitum, the lower limit of the preferable amount of addition per gram of the used curable composition is 0.1 mL, while the upper limit of the preferable amount of addition is 10 mL. When the amount of addition is too small, the effects resulting from used of the solvent such as lowering of the viscosity can be hardly achieved, while when the amount of addition is too large, the solvent may remain in the material, thereby being likely to cause problems such as heat crack, and may lead to disadvantages in terms of the cost, whereby the industrial utility value can be reduced. These solvents may be used alone, or can be used as a mixed solvent of two or more thereof.

(Other Additives)

To the curable composition of the present invention can be further added a colorant, a release agent, a fire retardant, a flame retardant aid, a surfactant, a deforming agent, an emulsifying agent, a levelling agent, a repelling protective agent, an ion trapping agent such as antimony-bismuth, a thixotropy improver, a tackifier, a storage stability improver, an antiozonant, a light stabilizer, a thickening agent, a plasticizer, a reactivity diluent, an oxidation inhibitor, a heat stabilizer, an electric conductivity improver, an antistatic agent, a radiation shielding agent, a nucleating agent, a phosphorus based peroxide decomposer, a lubricant, a pigment, a metal inactivator, a thermal conductivity improver, a physical property modifier, and the like, in the range not to impair the object and effects of the present invention.

(Process for Preparing Curable Composition, and Curing Process)

The process for preparing the curable composition is not particularly limited, and the composition can be prepared by any of a variety of processes. Various kinds of the components may be prepared and mixed immediately before curing, or all components may be prepared and mixed in a single liquid state beforehand, and stored at a low temperature. When additives such as a thermoplastic resin are used in addition to the modified polyorganosiloxane compound, for the purpose of improving the physical properties, these additives and the cation polymerization initiator may be mixed beforehand and stored, and then each may be mixed in a predetermined amount for the preparation immediately before the curing. By dissolving the cation polymerization initiator in the additive such as the thermoplastic resin beforehand, the mixing time period can be shortened, and necessity of dissolving the cation polymerization initiator in a volatile solvent can be avoided. In the case in which the cation polymerization initiator is prepared and mixed with the modified polyorganosiloxane compound, and then the mixture is stored, deterioration during the storage can occur because of the reactivity of the epoxy group or the oxetanyl group.

The thermosetting temperature may be predetermined at any of a variety of settings, but the lower limit of the preferred temperature is 30° C., more preferably 60° C., and still more preferably 90° C. The upper limit of the preferred temperature is 250° C., more preferably 200° C., and still more preferably 150° C. When the reaction temperature is too low, the reaction time required for sufficient reaction may be lengthened. When the reaction temperature is too high, coloring may be caused, or protrusion may be generated.

The curing may be carried out at a constant temperature, however, the temperature may be altered in multiple steps or continuously as needed. It is more preferred to allow for the reaction while elevating the temperature in multiple steps or continuously, than to conduct at a constant temperature because the cured product with less coloring and less strain is more likely to be obtained.

The light source which can be used for photocuring may be a light source involving the wavelength in the range of usually 200 to 450 nm such as, for example, a high pressure mercury lamp, an extra-high pressure mercury lamp, a metal halide lamp, a high-power metal halide lamp, a xenon lamp, a carbon arc lamp, a light emitting diode, or the like. A light source which emits light with the absorption wavelength of the used cation polymerization initiator or sensitizer may be employed. The exposure value is not particularly limited, but is preferably in the range of 10 to 5,000 mJ/cm$^2$, and more preferably 20 to 1,000 mJ/cm$^2$. When the exposure value is too small, the curing does not occur. When the exposure value is too large, discoloration may be caused due to the quick hardening. Preferable curing time falls within the range of 30 to 120 sec, and more preferably 1 to 60 sec. When the curing time is too long, advantageous feature of quick hardening in photocuring may not be taken.

(Application)

The curable composition or the cured product of the present invention can be used in a variety of applications. It can be applied to various applications in which conventional epoxy resin adhesives may be used.

Examples of the application include e.g., transparent materials, optical materials, optical lenses, optical films, optical sheets, adhesives for optical parts, optical adhesives for optical waveguide coupling, adhesives for fixing members around optical waveguide, adhesives for laminating DVD, agglutinants, dicing tapes, electronic materials, insulating materials (including print basal plates, wire coatings etc.), high voltage insulating materials, interlayer insulating films, packings for insulation, insulating coating materials, adhesives, highly heat resistant adhesives, highly exoergic adhesives, optical adhesives, adhesives for LED elements, adhesives for various basal plates, adhesives for heat sinks, paints, UV powder paints, inks, colored inks, inks for UV ink jet, coating materials (including hard coatings, sheets, films, coatings for release coated papers, coatings for optical disks, coatings for optical fibers and the like), molding materials (including sheets, films, FRP etc.), ceiling materials, potting materials, sealing materials, sealing materials for light emitting diode, optical semiconductor sealing materials, liquid crystal sealing agents, sealing agents for display devices, sealing materials for electric materials, sealing materials for solar cells, highly heat resistant sealing materials, resist materials, liquid resist materials, colored resists, dry film resist materials, solder resist materials, materials for color filters, stereo lithographies, materials for electronic papers, materials for holograms, materials for solar cells, materials for fuel cells, materials for displays, recording materials, vibration isolating materials, waterproof materials, moisture-proof materials, thermal contractive rubber tubes, o-rings, photoconductor drums for copying machines, solid electrolytes for batteries, and gas separation membranes. In addition, protective materials for concretes, linings, soil injection agents, heat storage or heat absorption materials, sealing materials for sterilization equipments, contact lenses, oxygen enrichment membranes, as well as additives for other resins, and the like may be exemplified.

EXAMPLES

Examples and Comparative Examples of the present invention are demonstrated hereinbelow, but the present invention is not limited thereto.

The, SiH group value and the remaining allyl group value of the intermediate reaction product of the modified polyorganosiloxane compound, the remaining SiH group value and epoxy group value of the modified polyorganosiloxane compound, and the molecular weight of the modified polyorganosiloxane compound produced in Examples and Comparative Examples of the present invention were measured as follows.

(NMR)

A 300 MHz NMR apparatus manufactured by Varian Technologies Japan Limited was used. The reaction rate of the allyl group in the synthesis of the (B) component was measured by charging a tube for NMR with the reaction liquid diluted with chloroform-d ($CDCl_3$) to approximately 1%, and determination was made based on the peak of the methylene group derived from the unreacted allyl group, and on the peak of the methylene group derived from the reacted allyl group. The functional group value of the modified polyorganosiloxane compound was determined on the epoxy group value (mmol/g) and the SiH group value (mmol/g) as converted based on dibromoethane.

(GPC)

LC MODULE 1 manufactured by WATERS Corporation, four columns, and an RI detector were used. A toluene solution of about 1% by weight was prepared, and the molecular weight in a toluene solvent at a flow rate of 1 ml/min, and a column temperature of 40° C. was determined indicated as the molecular weight of polystyrene standard.

Synthesis Example 1

In a 2-L autoclave were charged 602 g of toluene and 626 g of 1,3,5,7-tetramethylcyclotetrasiloxane. After the gas phase was substituted with nitrogen, the mixture was heated while stirring at an internal temperature of 105° C. Thereto was added a mixed solution of 90.0 g of triallyl isocyanurate, 90.0 g of toluene and 0.0570 g of a solution of a platinum vinylsiloxane complex in xylene (containing 3 wt % by platinum) dropwise over 40 min. Four hours after completing the dropwise addition, the reaction rate of the allyl group was determined with $^1$H-NMR to be no less than 95%, and the reaction was then terminated by cooling. The unreacted 1,3,5,7-tetramethylcyclotetrasiloxane and toluene were evaporated under reduced pressure to obtain "reaction product 1", as a colorless and transparent liquid. The "reaction product 1" was revealed to be yielded by the reaction of a part of the SiH group of 1,3,5,7-tetramethylcyclotetrasiloxane with the allyl group of triallyl isocyanurate, and to have a SiH group value of 9.2 mmol/g by determination with $^1$H-NMR. In addition, a chromatogram with multiple peaks was obtained by determination with GPC of the "reaction product 1", indicating that the product was a mixture not including compounds having a molecular weight of no higher than 600.

[chemical formula 35]

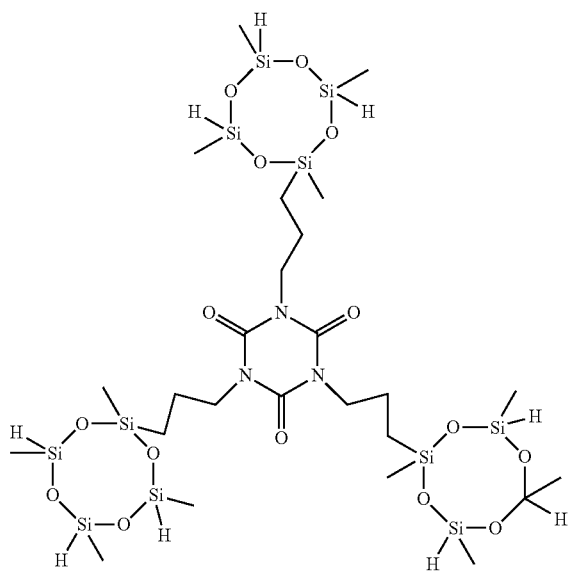

Furthermore, in a 2-L autoclave were charged 600 g of toluene and 200 g of the "reaction product 1". After the gas phase was substituted with nitrogen, the mixture was heated while stirring at an internal temperature of 105° C. Thereto was added a mixed solution of 76.2 g of 1,2-epoxy-4-vinyl-cyclohexane, 72.6 g of toluene and 0.0200 g of a solution of a platinum vinylsiloxane complex in xylene (containing 3 wt % by platinum) dropwise over 30 min. Thirty minutes after completing the dropwise addition, the reaction rate of the vinyl group was determined with $^1$H-NMR to be no less than 95%. Following adding 0.0403 g of triphenylphosphine as a gelation inhibitor in a 100-fold dilution with toluene, the reaction liquid was cooled. This reaction liquid was devolatilized to obtain a colorless and transparent modified polyorganosiloxane compound. Thus resulting modified polyorganosiloxane compound was revealed to be yielded by the reaction of a part of the SiH group of the "reaction product 1" with the vinyl group of 1,2-epoxy-4-vinylcyclohexane, and to have an epoxy group value of 2.5 mmol/g and a remaining SiH group value of 4.5 mmol/g by determination with $^1$H-NMR. As a result of determination with GPC, the resulting modified polyorganosiloxane compound showed a chromatogram with multiple peaks not including compounds having a molecular weight of no higher than 600, and thus it was suggested to be a mixture of compounds yielded by the reaction of 1,3,5,7-tetramethylcyclotetrasiloxane, 1,2-epoxy-4-vinylcyclohexane and triallyl isocyanurate.

Synthesis Example 2

In a 1-L flask were charged 450 g of toluene and 150 g of the "reaction product 1" of Synthesis Example 1. After the gas phase was substituted with nitrogen, the mixture was heated while stirring at an internal temperature of 100° C. Thereto was added a mixed solution of 85.8 g of 1,2-epoxy-4-vinyl-cyclohexane, 85.8 g of toluene and 0.0090 g of a solution of a platinum vinylsiloxane complex in xylene (containing 3 wt % by platinum) dropwise over 90 min. Sixty minutes after completing the dropwise addition, the reaction rate of the vinyl group was determined with $^1$H-NMR to be no less than 95%. Following adding 0.0363 g of triphenylphosphine as a gelation inhibitor in a 100-fold dilution with toluene, the reaction liquid was cooled. This reaction liquid was devolatilized to obtain a colorless and transparent modified polyorganosiloxane compound. Thus resulting modified polyorganosiloxane compound was revealed to be yielded by the reaction of a part of the SiH group of the "reaction product 1" with the vinyl group of 1,2-epoxy-4-vinylcyclohexane, and to have an epoxy group value of 3.3 mmol/g and a remaining SiH group value of 3.0 mmol/g by determination with $^1$H-NMR. As a result of determination with GPC, the resulting modified polyorganosiloxane compound showed a chro-

[chemical formula 36]

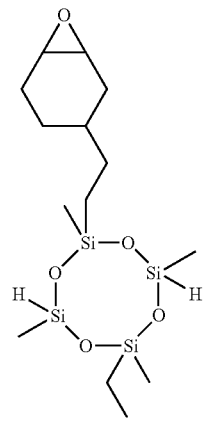

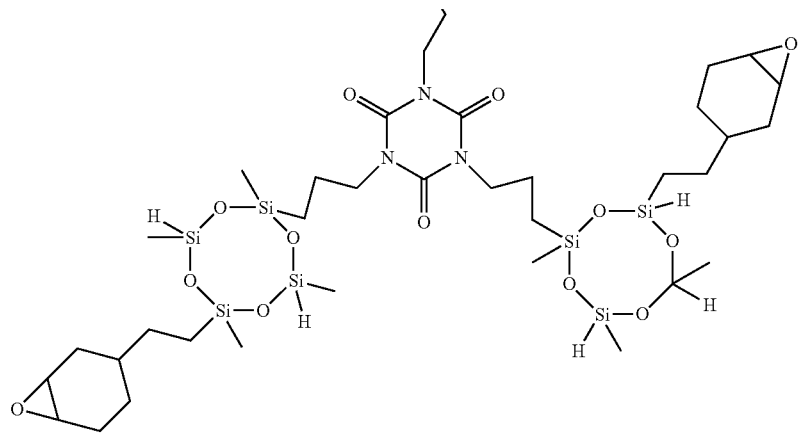

matogram with multiple peaks not including compounds having a molecular weight of no higher than 600, and thus it was suggested to be a mixture of compounds yielded by the reaction of 1,3,5,7-tetramethylcyclotetrasiloxane, 1,2-epoxy-4-vinylcyclohexane and triallyl isocyanurate.

xylene (containing 3 wt % by platinum) was added dropwise over 30 min. Sixty minutes after completing the dropwise addition, the reaction rate of the allyl group was determined with $^1$H-NMR to be no less than 95%. Following adding 0.0551 g of triphenylphosphine as a gelation inhibitor in a

[chemical formula 37]

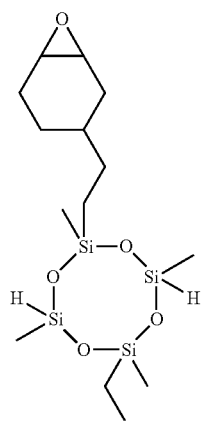

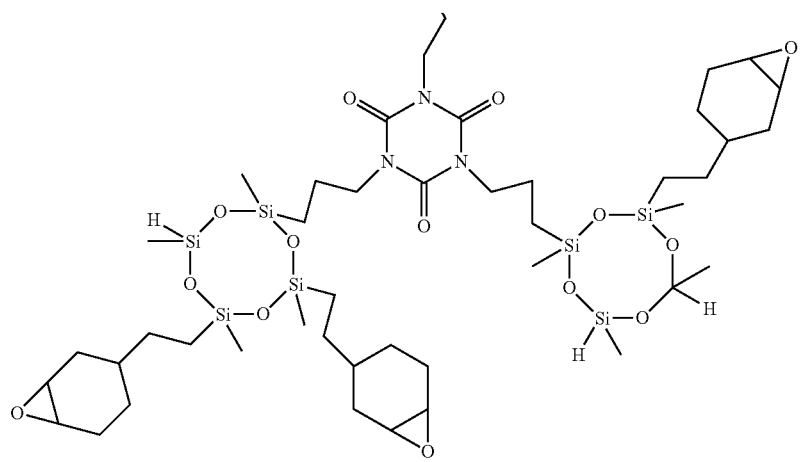

Synthesis Example 3

In a 1-L flask were charged 381 g of toluene and 136 g of 1,3,5,7-tetramethylcyclotetrasiloxane. After the gas phase was substituted with nitrogen, the mixture was heated while stirring at an internal temperature of 65° C. Thereto was added a mixed solution of 100 g of 1,2-epoxy-4-vinylcyclohexane, 100 g of toluene and 0.0105 g of a solution of a platinum vinylsiloxane complex in xylene (containing 3 wt % by platinum) dropwise over 90 min. Sixty minutes after completing the dropwise addition, the reaction rate of the vinyl group was determined with $^1$H-NMR to be no less than 95%. The internal temperature was elevated to 108° C., and a mixture of 44.5 g of triallyl isocyanurate, 44.5 g of toluene and 0.0174 g of a solution of platinum vinylsiloxane complex in 100-fold dilution with toluene, the mixture was cooled. This reaction liquid was devolatilized to obtain a colorless and transparent modified polyorganosiloxane compound. Thus resulting modified polyorganosiloxane compound was revealed to be yielded by the reaction of a part of the SiH group of 1,3,5,7-tetramethylcyclotetrasiloxane with the vinyl group of 1,2-epoxy-4-vinylcyclohexane and with the allyl group of triallyl isocyanurate, and to have an epoxy group value of 3.0 mmol/g and a SiH group value of 3.4 mmol/g by determination with $^1$H-NMR. As a result of determination with GPC, the resulting modified polyorganosiloxane compound showed a chromatogram with multiple peaks including compounds having a molecular weight of no higher than 600, and thus it was suggested to be a mixture of compounds yielded by the reaction of 1,3,5,7-tetramethylcyclotetrasiloxane and 1,2-epoxy-4-vinylcyclohexane, and compounds yielded by the reaction of 1,3,5,7-tetramethylcyclotetrasiloxane, 1,2-epoxy-4-vinylcyclohexane and triallyl isocyanurate.

$^1$H-NMR. Moreover, determination of the compound with GPC revealed a chromatogram with multiple peaks including compounds having a molecular weight of no higher than 600,

[chemical formula 38]

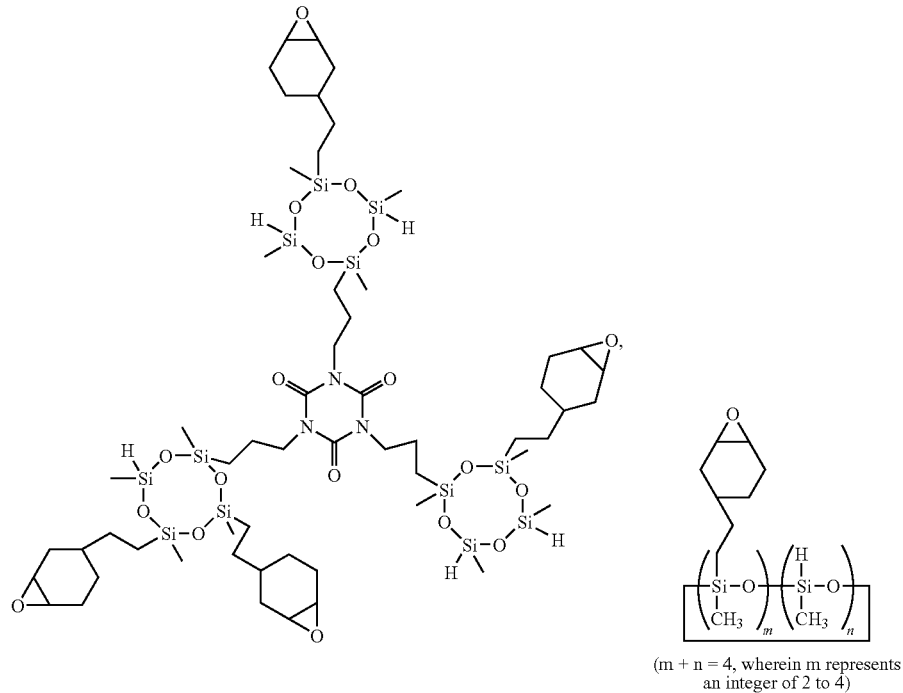

(m + n = 4, wherein m represents an integer of 2 to 4)

Synthesis Example 4

In a 2-L autoclave were charged 381 g of toluene and 136 g of 1,3,5,7-tetramethylcyclotetrasiloxane. After the gas phase was substituted with nitrogen, the mixture was heated while stirring at an internal temperature of 60° C. Thereto was added a mixed solution of 100 g of vinylcyclohexeneoxide(1, 2-epoxy-4-vinylcyclohexane), 100 g of toluene and 0.0262 g of a solution of a platinum vinylsiloxane complex in xylene (containing 3 wt % by platinum) dropwise over 60 min. After completing the dropwise addition, the internal temperature was elevated to 70° C., and the reaction was allowed for 60 min. The reaction rate of the vinyl group was then determined with $^1$H-NMR to be no less than 95%. The internal temperature was elevated to 105° C., and a mixture of 44.5 g of triallyl isocyanurate, 44.5 g of toluene and 0.0174 g of a solution of platinum vinylsiloxane complex in xylene (containing 3 wt % by platinum) was added dropwise over 40 min. After completing the dropwise addition, the internal temperature was elevated to 110° C., and the reaction was allowed for 180 min. The reaction rate of the allyl group was thereafter determined with $^1$H-NMR to be no less than 95%. Following adding 0.176 g of triphenylphosphine as a gelation inhibitor in a 100-fold dilution with toluene, the mixture was cooled. This reaction liquid was devolatilized to obtain a colorless and transparent modified polyorganosiloxane compound. Thus resulting modified polyorganosiloxane compound was revealed to be yielded by the reaction of a part of the SiH group of 1,3,5,7-tetramethylcyclotetrasiloxane with the vinyl group of vinylcyclohexeneoxide(1,2-epoxy-4-vinylcyclohexane) and with the allyl group of triallyl isocyanurate, and to have an epoxy group value of 3.1 mmol/g and a remaining SiH group value of 3.1 mmol/g by determination with $^1$H-NMR. Moreover, determination of the compound with GPC revealed a chromatogram with multiple peaks including compounds having a molecular weight of no higher than 600, and thus it was suggested to be a mixture of compounds yielded by the reaction of 1,3,5,7-tetramethylcyclotetrasiloxane and vinylcyclohexeneoxide(1,2-epoxy-4-vinylcyclohexane), and compounds yielded by the reaction of 1,3,5,7-tetramethylcyclotetrasiloxane, vinylcyclohexeneoxide(1,2-epoxy-4-vinylcyclohexane) and triallyl isocyanurate, similarly to Synthesis Example 3.

Synthesis Example 5

In a 1-L flask were charged 300 g of toluene and 100 g of the "reaction product 1" prepared in Synthesis Example 1. After the gas phase was substituted with nitrogen, the mixture was heated while stirring at an internal temperature of 105° C. Thereto was added a mixed solution of 57.2 g of vinylcyclohexeneoxide(1,2-epoxy-4-vinylcyclohexane), 57.2 g of toluene and 0.0150 g of a solution of a platinum vinylsiloxane complex in xylene (containing 3 wt % by platinum) dropwise over 60 min. Sixty minutes after completing the dropwise addition, the reaction rate of the vinyl group was determined with $^1$H-NMR to be no less than 95%. Following adding 0.0605 g of triphenylphosphine as a gelation inhibitor in a 100-fold dilution with toluene, the mixture was cooled. This reaction liquid was devolatilized to obtain a colorless and transparent modified polyorganosiloxane compound. Thus resulting modified polyorganosiloxane compound was revealed to be yielded by the reaction of a part of the SiH group of the "reaction product 1" with the vinyl group of vinylcyclohexeneoxide(1,2-epoxy-4-vinylcyclohexane), and to have an epoxy group value of 3.0 mmol/g and a remaining SiH group value of 3.1 mmol/g by determination with $^1$H-NMR. Moreover, determination of the compound with GPC revealed a chromatogram with multiple peaks not including compounds having a molecular weight of no higher than 600, and thus it was suggested to be a mixture of compounds yielded by the reaction of 1,3,5,7-tetramethylcyclotetrasiloxane, vinylcyclohexeneoxide(1,2-epoxy-4-vinylcyclohexane) and triallyl isocyanurate, similarly to Synthesis Example 2.

Synthesis Example 6

In a 2-L autoclave were charged 600 g of toluene and 150 g of the "reaction product 1" of Synthesis Example 1. After the gas phase was substituted with nitrogen, the mixture was heated while stirring at an internal temperature of 105° C. Thereto was added a mixed solution of 57.2 g of vinylcyclohexeneoxide(1,2-epoxy-4-vinylcyclohexane), 57.2 g of toluene and 0.0150 g of a solution of a platinum vinylsiloxane complex in xylene (containing 3 wt % by platinum) dropwise Thereto was added a mixed solution of 300 g of triallyl isocyanurate, 300 g of toluene and 0.188 g of a solution of a platinum vinylsiloxane complex in xylene (containing 3 wt % by platinum) dropwise over 60 min. Sixth minutes after completing the dropwise addition, the reaction rate of the allyl group was determined with $^1$H-NMR to be no less than 95%, and the reaction was then terminated by cooling. The unreacted 1,3,5,7-tetramethylcyclotetrasiloxane and toluene were evaporated under reduced pressure to obtain "reaction product 2", as a colorless and transparent liquid. The "reaction product 2" was revealed to be yielded by the reaction of a part of the SiH group of 1,3,5,7-tetramethylcyclotetrasiloxane with the allyl group of triallyl isocyanurate, and to have a SiH group value of 5.5 mmol/g by determination with $^1$H-NMR. In addition, a chromatogram with multiple peaks was obtained by determination with GPC of the "reaction product 2", indicating that the product was a mixture not including compounds having a molecular weight of no higher than 600.

[chemical formula 39]

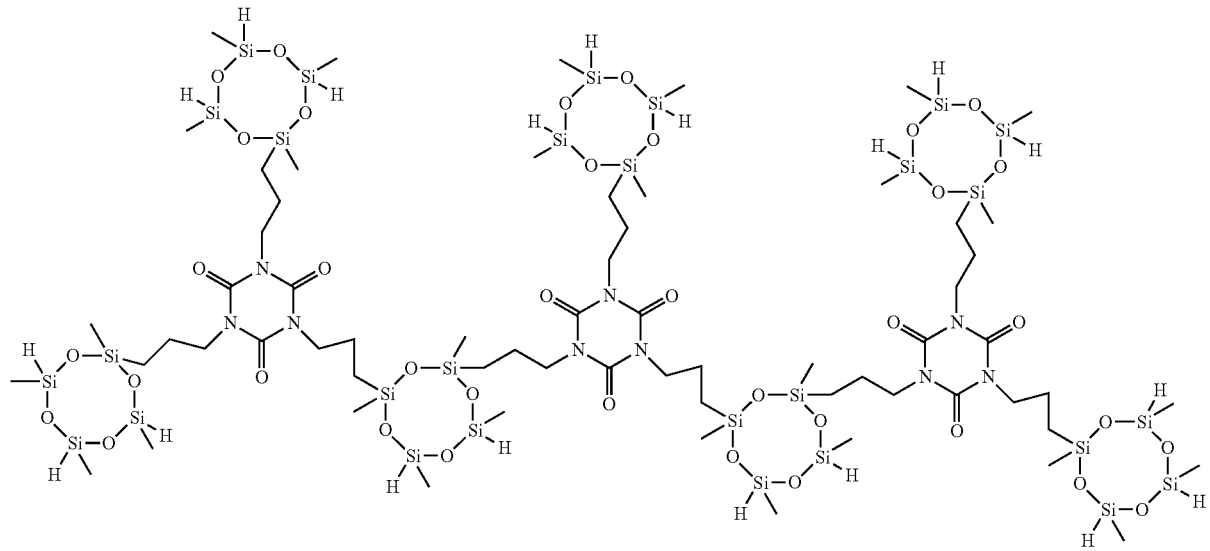

over 20 min. Sixty minutes after completing the dropwise addition, the reaction rate of the vinyl group was determined with $^1$H-NMR to be no less than 95%. Following adding 0.0303 g of triphenylphosphine in 3 g of toluene as a gelation inhibitor, the mixture was cooled. This reaction liquid was devolatilized to obtain a colorless and transparent modified polyorganosiloxane compound. Thus resulting modified polyorganosiloxane compound was revealed to be yielded by the reaction of a part of the SiH group of the "reaction product 1" with the vinyl group of vinylcyclohexeneoxide(1,2-epoxy-4-vinylcyclohexane), and to have an epoxy group value of 2.6 mmol/g and a remaining SiH group value of 4.5 mmol/g by determination with $^1$H-NMR. Moreover, determination of the compound with GPC revealed a chromatogram with multiple peaks not including compounds having a molecular weight of no higher than 600, and thus it was suggested to be a mixture of compounds yielded by the reaction of 1,3,5,7-tetramethylcyclotetrasiloxane, vinylcyclohexeneoxide(1,2-epoxy-4-vinylcyclohexane) and triallyl isocyanurate, similarly to Synthesis Example 1.

Synthesis Example 7

In a 5-L separable flask were charged 2,330 g of toluene and 709 g of 1,3,5,7-tetramethylcyclotetrasiloxane. After the gas phase was substituted with nitrogen, the mixture was heated while stirring at an internal temperature of 105° C.

Furthermore, in a 0.5-L flask were charged 200 g of toluene and 100 g of the "reaction product 2". After the gas phase was substituted with nitrogen, the mixture was heated while stirring at an internal temperature of 105° C. Thereto was added a mixed solution of 16.2 g of vinylcyclohexeneoxide(1,2-epoxy-4-vinylcyclohexane), 16.2 g of toluene and 0.00423 g of a solution of a platinum vinylsiloxane complex in xylene (containing 3 wt % by platinum) dropwise over 30 min. Sixty minutes after completing the dropwise addition, the reaction rate of the vinyl group was determined with $^1$H-NMR to be no less than 95%. Following adding 0.0373 g of triphenylphosphine as a gelation inhibitor in a 100-fold dilution with toluene, the mixture was cooled. This reaction liquid was devolatilized to obtain a colorless and transparent modified polyorganosiloxane compound. Thus resulting modified polyorganosiloxane compound was revealed to be yielded by the reaction of a part of the SiH group of the "reaction product 2" with the vinyl group of vinylcyclohexeneoxide(1,2-epoxy-4-vinylcyclohexane), and to have an epoxy group value of 1.4 mmol/g and a remaining SiH group value of 4.3 mmol/g by determination with $^1$H-NMR. Moreover, determination of the compound with GPC revealed a chromatogram with multiple peaks not including compounds having a molecular weight of no higher than 600, and thus it was suggested to be a mixture of compounds yielded by the reaction of 1,3,5,7-tetramethylcyclotetrasiloxane, vinylcyclohexeneoxide(1,2-epoxy-4-vinylcyclohexane) and triallyl isocyanurate.

[chemical formula 40]

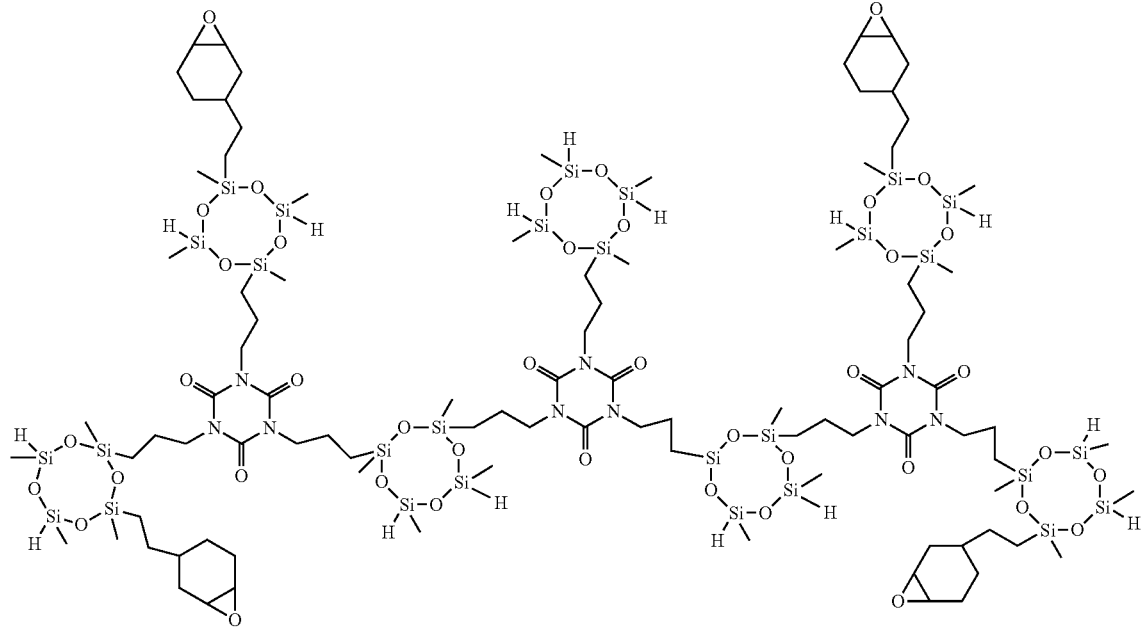

Comparative Synthesis Example 1

In a 2-L autoclave were charged 719 g of toluene and 153 g of 1,3,5,7-tetramethylcyclotetrasiloxane. After the gas phase was substituted with nitrogen, the mixture was stably kept at an internal temperature of 60° C. while stirring. Thereto was added a mixed solution of 315 g of 1,2-epoxy-4-vinylcyclohexane, 315 g of toluene and 0.0330 g of a solution of a platinum vinylsiloxane complex in xylene (containing 3 wt % by platinum) dropwise over 100 min. After completing the dropwise addition, the internal temperature was elevated to 80° C., and 180 min after completing the dropwise addition, it was determined with $^1$H-NMR that reaction of 95% or more of the vinyl group of 1,2-epoxy-4-vinylcyclohexane was permitted. Following adding 0.133 g of triphenylphosphine as a gelation inhibitor in a 100-fold dilution with toluene, the mixture was cooled. This reaction liquid was devolatilized to obtain a pale yellow and transparent modified polyorganosiloxane compound. Thus resulting modified polyorganosiloxane compound was revealed to be a reaction product of the SiH group of 1,3,5,7-tetramethylcyclotetrasiloxane with the vinyl group of 1,2-epoxy-4-vinylcyclohexane, and to have an epoxy group value of 6.45 mmol/g by determination with $^1$H-NMR. As a result of determination with GPC, the resulting modified polyorganosiloxane compound showed a chromatogram with a single peak, and thus it was suggested to be a compound yielded by a reaction of 1,3,5,7-tetramethylcyclotetrasiloxane with four molecules of 1,2-epoxy-4-vinylcyclohexane.

[chemical formula 41]

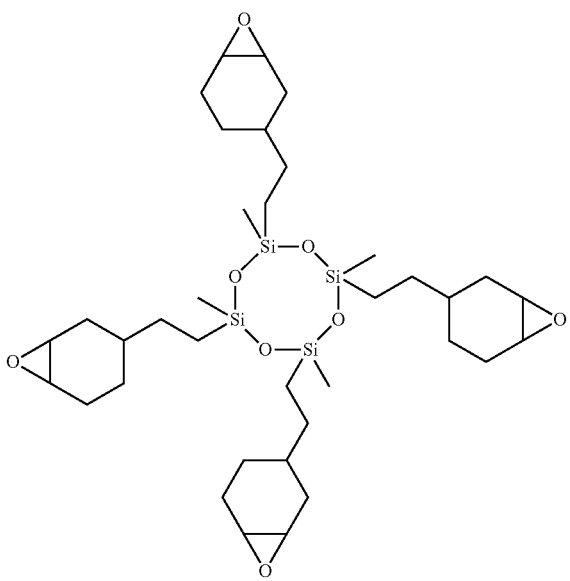

Comparative Synthesis Example 2

In a 1-L flask were charged 327 g of toluene and 69.2 g of 1,3,5,7-tetramethylcyclotetrasiloxane. After the gas phase was substituted with nitrogen, the mixture was stably kept at an internal temperature of 95° C. while stirring. Thereto was added a mixed solution of 150 g of vinylcyclohexeneoxide(1,2-epoxy-4-vinylcyclohexane), 150 g of toluene and 0.0390 g of a solution of a platinum vinylsiloxane complex in xylene (containing 3 wt % by platinum) dropwise over 100 min. The internal temperature rose to 100° C. at most, during the dropwise addition. After completing the dropwise addition, when the internal temperature got settled, the internal temperature was elevated to 110° C., and stably kept. Then 300 min after starting the dropwise addition, it was determined with $^1$H-NMR that reaction of 95% or more of the vinyl group of vinylcyclohexeneoxide(1,2-epoxy-4-vinylcyclohexane) was permitted. Following adding 0.0630 g of triphenylphosphine as a gelation inhibitor in a 100-fold dilution with toluene, the mixture was cooled. This reaction liquid was devolatilized to obtain a pale yellow and transparent modified polyorganosiloxane compound. Thus resulting modified polyorganosiloxane compound was revealed to be a reaction product of the SiH group of 1,3,5,7-tetramethylcyclotetrasiloxane with the vinyl group of vinylcyclohexeneoxide(1,2-epoxy-4-vinylcyclohexane), and to have an epoxy group value of 6.3 mmol/g by determination with $^1$H-NMR. Moreover, determination of the compound with GPC revealed a chromatogram with a single peak showing a molecular weight of 470, and thus it was suggested to be a compound yielded by a reaction of 1,3,5,7-tetramethylcyclotetrasiloxane with four molecules of vinylcyclohexeneoxide(1,2-epoxy-4-vinylcyclohexane), similarly to Comparative Synthesis Example 1.

Examples 1 to 4

Curable compositions were produced using the modified polyorganosiloxane compound obtained in Synthesis Example 1 to 3 as the modified organosiloxane compound having an epoxy group, a 50 wt % solution in PGMEA of a boron based aromatic iodonium salt (Rhodia Limited, trade name: RHODORSIL PI2074) as the cation polymerization initiator, and an oxetane compound (Toagosei Co., Ltd., trade name: OXT-121) at a compounding ratio shown in Table 1. In the compounding process, the compound having an epoxy group or an oxetanyl group was mixed with a specified amount of the cation polymerization initiator, followed by stirring and degassing to give a curable composition. The curable composition was poured into a call prepared by sandwiching a silicone rubber sheet having a thickness of 3 mm as a spacer between two glass plates, and heated at 70° C. for 1 hour, at 90° C. for 1 hour, at 110° C. for 1 hour, at 130° C. for 1 hour, and at 150° C. for 2 hours, followed by slowly cooling to obtain a cured product. Observation of the appearance, measurement of the glass transition temperature, measurement of light transmittance, heat resistance test, light resistance test, and temperature cycle shock test on each of thus resulting cured products were conducted as described below. These results are shown in Table 1.

Appearance of Cured Product

The produced cured product was placed on a white paper, and visually evaluated.

Glass Transition Temperature

A test piece of 3 mm×5 mm×30 mm was cut out from the produced cured product, and the dynamic viscoelasticity of the test piece was determined using DVA-200 manufactured by IT Keisoku Seigyo K.K., under a condition to provide: a tension mode, measuring frequency of 10 Hz, distortion of 0.01%, static/dynamic ratio of 1.5, rate of temperature rise of 5° C./min. The peak temperature of tan δ was determined as the glass transition temperature of the cured product.

Light Transmittance

A test piece of 3 mm×10 mm×30 mm was cut out from the produced cured product, and the light transmittance of the test piece was measured using U-3300 manufactured by Hitachi, Ltd., under a condition to provide a scan speed of 300 nm/min.

Heat Resistance Test

After a test piece of 3 mm×10 mm×30 mm cut out from the produced cured product was kept in an oven at 200° C. for 24 hours, the light transmittance was measured (equipment: U-3300 manufactured by Hitachi, Ltd., condition: scan speed of 300 nm/min).

Light Resistance Test

After a test piece of 3 mm×10 mm×30 mm cut out from the produced cured product was irradiated using Metaling Weather Meter model M6T manufactured by Suga Test Instruments Co., Ltd., at a temperature in basin of 105° C., an irradiance of 0.53 kW/m$^2$, and an integrated irradiance up to 50 MJ/m$^2$, the light transmittance was measured (equipment: U-3300 manufactured by Hitachi, Ltd., condition: scan speed of 300 nm/min).

Temperature Cycle Shock Test

A test piece of 3 mm×5 mm×30 mm was cut out from the produced cured product, and the test piece was immersed in a solder bath at 260° C. for 10 sec. Immediately, the test piece was immersed in a water bath at no higher than 20° C. for 10 sec, and thereafter, generation of the crack of the test piece was visually observed. When the number of the crack in the test piece was 0 to 3, the evaluation was made as A; when the number was 4 to 10, the evaluation was made as B; and when the number was 11 or larger, the evaluation was made as C.

Comparative Examples 1 to 4

Cured products were obtained after producing curable compositions in a similar manner to Examples 1 to 4 except that the modified organosiloxane compound obtained in Comparative Synthesis Example 1 as the modified siloxane compound having an epoxy group, an oxetanyl group-containing silsesquioxane (Toagosei Co., Ltd., trade name: OX-SQ, OX-SQ SI20), and an antimony based iodonium salt (ADEKA CORPORATION, trade name: Adekaopton CP-77) as the cation polymerization initiator were used. Observation of the appearance, measurement of the glass transition temperature, measurement of light transmittance, heat resistance test, light resistance test, and temperature cycle shock test on each of thus resulting cured products were conducted similarly to Examples 1 to 4. These results are shown in Table 1.

TABLE 1

|  |  | Ex. 1 | Ex. 2 | Ex. 3 | Ex. 4 | Compar. Ex. 1 | Compar. Ex. 2 | Compar. Ex. 3 | Compar. Ex. 4 |
|---|---|---|---|---|---|---|---|---|---|
| Blend ratio (part by weight) | Product in Synthesis Ex. 1 | 100 |  |  | 80.0 |  |  |  |  |
|  | Product in Synthesis Ex. 2 |  | 100 |  |  |  |  |  |  |
|  | Product in Synthesis Ex. 3 |  |  | 100 |  |  |  |  |  |
|  | Product in Compar. |  |  |  |  | 100 | 100 | 80.0 | 80.0 |

TABLE 1-continued

|  |  | Ex. 1 | Ex. 2 | Ex. 3 | Ex. 4 | Compar. Ex. 1 | Compar. Ex. 2 | Compar. Ex. 3 | Compar. Ex. 4 |
|---|---|---|---|---|---|---|---|---|---|
|  | Synthesis Ex. 1 |  |  |  |  |  |  |  |  |
|  | OX-SQ |  |  |  |  |  |  | 20.0 |  |
|  | OX-SQ SI20 |  |  |  |  |  |  |  | 20.0 |
|  | OXT-121 |  |  |  | 20.0 |  |  |  |  |
|  | Adekaopton CP-77 |  |  |  |  | 0.15 |  | 0.15 | 0.15 |
|  | Rohdorsil PI2074 50 wt % PGMEA | 0.10 | 0.10 | 0.10 | 0.10 |  | 0.10 |  |  |
| Results of measurement and evaluation | Appearance following curing | colorless, transparent | colorless, transparent | colorless, transparent | colorless, transparent | pale yellow, transparent | brown, transparent | pale yellow, transparent | pale yellow, transparent |
|  | Glass transition temperature (° C.) | 96 | 133 | 131 | 97 | 66 | unmeasurable *1 | 82 | 87 |
|  | Light transmittance (% T) prior to tests |  |  |  |  |  |  |  |  |
|  | (400 nm) | 90 | 91 | 89 | 91 | 82 | 62 | 80 | 83 |
|  | (430 nm) | 91 | 92 | 90 | 92 | 89 | 71 | 89 | 88 |
|  | (450 nm) | 91 | 92 | 90 | 92 | 91 | 71 | 91 | 90 |
|  | 200° C., 24 h |  |  |  |  |  |  |  |  |
|  | (400 nm) | 45 | 28 | 33 | 21 | 4 | 0 | 3 | 2 |
|  | (430 nm) | 66 | 52 | 57 | 46 | 18 | 5 | 15 | 12 |
|  | (450 nm) | 74 | 63 | 67 | 59 | 30 | 11 | 26 | 23 |
|  | Metaling 50MJ |  |  |  |  |  |  |  |  |
|  | (400 nm) | 83 | 82 | 84 | 78 | 77 | 62 | 78 | 74 |
|  | (430 nm) | 87 | 87 | 88 | 85 | 84 | 74 | 85 | 82 |
|  | (450 nm) | 89 | 89 | 89 | 88 | 87 | 79 | 87 | 85 |
|  | Temperature cycle shock test | A | A | B | A | C | C | C | C |

*1 The sample was broken before reaching to the tan δ peak temperature in determination of dynamic viscoelasticity The heat cured product obtained using the modified polyorganosiloxane compound of the present invention was more excellent in the heat-resistant and light-resistant transparency, and the crack resistance according to the temperature cycle shock test as compared with the cured products produced in Comparative Examples.

Examples 5 to 8

Curable compositions were produced using the modified polyorganosiloxane compound obtained in Synthesis Examples 4 to 7 as the compound having an epoxy group, and a 50 wt % solution in PGMEA of a boron based aromatic iodonium salt (Rhodia Limited, trade name: RHODORSIL PI2074) as the cation polymerization initiator, at a compounding ratio shown in Table 2. In the compounding process, the compound having an epoxy group was mixed with a specified amount of the cation polymerization initiator, followed by stirring and degassing to give a curable composition. However, the modified polyorganosiloxane compound having a high viscosity obtained in Synthesis Example 7 was used in a PGMEA solution of 80% polymer.

Each of the curable composition produced by the aforementioned method was coated on a PET film having a thickness of 130 μm with an applicator to give a thickness of 80 to 100 μm, and allowed to cure by light irradiation (photocuring). When PGMEA was used as the solvent, the photocuring was carried out after removing the solvent by heating at 70° C. for 1 hour. The exposure equipment, the exposure conditions and the actinometer employed for the photocuring herein are as in the following.

1) Exposure equipment: EYE GRANDAGE 3 kW standard conveyer type exposure equipment (manufactured by Eye Graphics Co., Ltd.), light source: 3 kW metal halide lamp;

2) Exposure condition: conveyer speed: 3 m/min, irradiance: 210 mW/cm$^2$, light volume: 2,400 mJ/cm$^2$, with light condensing type reflecting plate;

3) UV integrating actinometer: UIT-150 (manufactured by Ushio, Inc.), with UVD-C365 (manufactured by Ushio, Inc.) as the photo detector.

With respect to the produced curable composition and the resulting cured product, light curability test, heat resistance test, and light resistance test were conducted as described below. Evaluation results of these light cured products are shown in Table 2.

Light Curability Test

After thus produced curable composition was coated on a PET film to give a thickness of 80 to 100 μm, followed by exposure, another PET film was pressed on the coated film. When the PET film was smoothly detached, it was determined as nontackiness.

With respect to the evaluation item for the light curability in Table 2, nontackiness was represented by a symbol A.

Heat Resistance Test

The obtained cured product was kept in an oven at 150° C. for 24 hours, and the coloring was visually observed. The coloring visually observed in the heat resistance test was evaluated according to the following criteria.

A: colorless and transparent;
B: slightly colored and transparent; and
C: yellow, or more deeply colored Light Resistance Test After the obtained cured product was irradiated using Metaling Weather Meter (model M6T, manufactured by Suga Test Instruments Co., Ltd.), at a temperature in basin of 105° C., an irradiance of 0.53 kW/m$^2$, and an integrated irradiance up to 50 MJ/m$^2$, the coloring was visually observed. The coloring visually observed in the light resistance test was evaluated according to the following criteria.

A: colorless and transparent;
B: slightly colored and transparent; and
C: yellow, or more deeply colored Comparative Examples 5 to 6

Light cured products were obtained after producing the curable compositions in a similar manner to Examples 5 to 8 except that the modified organosiloxane compound obtained in Comparative Synthesis Example 2, or 3,4-epoxycyclohexenylmethyl-3',4'-epoxycyclohexenecarboxylate (Daicel Chemical Industries, Ltd., trade name: Celloxide 2021P) was used as the compound having an epoxy group. Evaluations of light curability on each of the curable compositions, and heat resistance test and light resistance test on the light cured product were made similarly to Examples 5 to 8. These results of evaluation are shown in Table 2.

TABLE 2

|  |  | Ex. 5 | Ex. 6 | Ex. 7 | Ex. 8 | Compar. Ex. 5 | Compar. Ex. 6 |
|---|---|---|---|---|---|---|---|
| Blended material (part by weight) | Product in Synthesis Ex. 4 | 100 |  |  |  |  |  |
|  | Product in Synthesis Ex. 5 |  | 100 |  |  |  |  |
|  | Product in Synthesis Ex. 6 |  |  | 100 |  |  |  |
|  | Product in Synthesis Ex. 7 |  |  |  | 100 |  |  |
|  | Product in Compar. Synthesis Ex. 2 |  |  |  |  | 100 |  |
|  | Celloxide 2021P |  |  |  |  |  | 100 |
|  | Rohdorsil PI2074 50 wt % PGMEA solution | 1.0 | 1.0 | 1.0 | 1.0 | 1.0 | 1.0 |
| Evaluation | Light curability of curable composition | A | A | A | A | A | A |
|  | Appearance of cured product prior to tests | A | A | A | A | A | A |
|  | Appearance of cured product following heat resistance test | A | A | A | A | C | C |
|  | Appearance of cured product following light resistance test | B | A | B | A | B | C |

The light cured product obtained using the modified polyorganosiloxane compound of the present invention was more excellent in the optical transparency, heat resistance and light resistance than the light cured product produced in Comparative Examples.

The invention claimed is:

1. A modified polyorganosiloxane compound having two or more epoxy group and/or oxetanyl group in a molecule, the compound being a hydrosilylation reaction product of the following compounds:
   (α1) an organic compound having 2 to 6 carbon-carbon double bonds reactive with a SiH group in a molecule;
   (β1) a linear and/or cyclic polyorganosiloxane compound having at least two SiH groups in a molecule; and
   (β1) a cyclic polyorganosiloxane compound having at least two SiH groups in a molecule; and
   (γ1) an organic compound having at least one epoxy group or oxetanyl group and one carbon-carbon double bond reactive with a SiH group in a molecule;
   wherein the compound (β1) is a cyclic polyorganosiloxane compound having a SiH group represented by the following general formula (II):

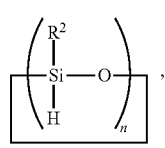

(II)

wherein, $R^2$ represents an organic group having 1 to 6 carbon atoms; and n represents an integer of 3 to 10, wherein the compound (γ1) is at least one selected from the group consisting of 1,2-epoxy-4-vinylcyclohexane and 3-ethyl-3-allyloxymethyloxetane, wherein the ratio Y/X of the total number (X) of the carbon-carbon double bonds reactive with the SiH group in the compound (α1) and the total number (Y) of the SiH groups in the compound (β1) is no less than 3, and wherein the ratio X'/Y' of the total number (X') of the carbon-carbon double bonds reactive with the SiH group in the compound (γ1), and the total number (Y') of the SiH groups in the reaction product of the compound (α1) and the compound (β1) after removing the unreacted compound (β1) is no greater than ⅔.

2. The modified polyorganosiloxane compound according to claim 1 wherein the compound (α1) is represented by the following general formula (I):

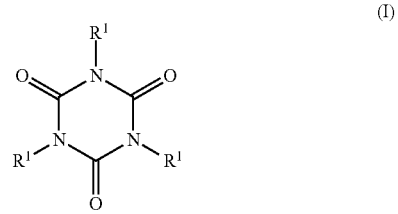

(I)

wherein, $R^1$ represents a monovalent organic group having 1 to 50 carbon atoms; each $R^1$ may be the same or different; and at least two $R^1$ include a carbon-carbon double bond reactive with a SiH group.

3. The modified polyorganosiloxane compound according to claim 1 wherein the compound (α1) is at least one selected from the group consisting of diallyl monoglycidyl isocyanurate, diallylmonobenzyl isocyanurate, 1,3-bis(allyloxy)adamantane, 1,3-bis(vinyloxy)adamantane, 1,4-cyclohexanedimethanol divinyl ether, dicyclopentadiene, divinylbenzene, vinylcyclohexene, 1,5-hexadiene, 1,9-decadiene, diallyl ether, triallyl isocyanurate, triallyl cyanurate, 1,2,4-trivinylcyclohexane, trimethylolpropane triallyl ether, 1,3,5-tris(allyloxy)adamantane, 1,3,5-tris(vinyloxy)adamantane, and pentaerythritol tetraallyl ether.

4. A curable composition comprising the modified polyorganosiloxane compound according to claim 1, and a cation polymerization initiator in an amount of 0.01 to 1.0 parts by weight per 100 parts by weight of the modified polyorganosiloxane compound.

5. The curable composition according to claim 4 wherein the cation polymerization initiator is at least one selected from the group consisting of a boron based aromatic iodonium salt, an antimony based aromatic iodonium salt, and a phosphorus based aromatic iodonium salt.

6. The curable composition according to claim 4 wherein the content of the cation polymerization initiator is 0.01 to 1.0 parts by weight per 100 parts by weight of the modified polyorganosiloxane compound.

7. The curable composition according to claim 4 further comprising an organic compound having at least one cation polymerizable functional group.

8. The curable composition according to claim 7 wherein the cation polymerizable functional group is at least one selected from the group consisting of an alicyclic epoxy group, a glycidyl group, an oxetanyl group, and a vinyl ether group.

9. The curable composition according to claim 7 wherein the organic compound having at least one cation polymerizable functional group is at least one selected from the group consisting of 1,4-bis{[(3-ethyl-3-oxetanyl)methoxy]methyl}benzene, bis[1-ethyl(3-oxetanyl)]methyl ether, and 3,4-epoxycyclohexenylmethyl-3',4'-epoxycyclohexenecarboxylate.

10. The curable composition according to claim 7 wherein the content of the organic compound having at least one cation polymerizable functional group is 1 to 100 parts by weight per 100 parts by weight of the modified polyorganosiloxane compound.

11. A cured product produced by curing the curable composition according to claim 4.

\* \* \* \* \*